United States Patent
Koudouridis et al.

(10) Patent No.: US 10,681,554 B2
(45) Date of Patent: Jun. 9, 2020

(54) AUTOMATIC CONFIGURATION TESTING AND VERIFICATION OF A COMMUNICATION NODE

(71) Applicant: HUAWEI TECHNOLOGIES CO., LTD., Shenzhen, Guangdong (CN)

(72) Inventors: George Koudouridis, Kista (SE); Henrik Lundqvist, Kista (SE)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/245,582

(22) Filed: Jan. 11, 2019

(65) Prior Publication Data
US 2019/0149996 A1    May 16, 2019

Related U.S. Application Data

(63) Continuation of application No. PCT/EP2016/066569, filed on Jul. 12, 2016.

(51) Int. Cl.
*H04M 3/16*       (2006.01)
*H04W 12/12*    (2009.01)
(Continued)

(52) U.S. Cl.
CPC ......... *H04W 12/1202* (2019.01); *H04W 8/24* (2013.01); *H04W 12/1002* (2019.01);
(Continued)

(58) Field of Classification Search
CPC . H04W 12/1202; H04W 24/02; H04W 24/10; H04W 8/24; H04W 12/1002; H04W 24/06
(Continued)

(56) References Cited

U.S. PATENT DOCUMENTS

2010/0299419 A1    11/2010 Ramankutty et al.
2013/0176884 A1    7/2013 Chang
(Continued)

FOREIGN PATENT DOCUMENTS

WO       2016096836 A1    6/2016

OTHER PUBLICATIONS

International Search Report dated Mar. 15, 2017 in corresponding International Application No. PCT/EP2016/066569.
(Continued)

*Primary Examiner* — Marcos Batista
(74) *Attorney, Agent, or Firm* — Womble Bond Dickinson (US) LLP

(57) ABSTRACT

A controller node for a wireless communication system includes a processor for operating the controller node in a configuration test context. The processor is configured to transmit at least one configuration test message including at least one configuration test setting and at least one operational setting to at least one first radio node and at least one second radio node, receive a test report indicating at least one result of at least one configuration test of the configuration test context, determine from the test report a capability of the at least one first radio node to operate as an authorized and verified radio node in the wireless communication system, and transmit the capability to the at least one first radio node that the at least one first radio node is an authorized and verified radio node.

11 Claims, 14 Drawing Sheets

(51) Int. Cl.
  *H04W 24/02* (2009.01)
  *H04W 12/10* (2009.01)
  *H04W 8/24* (2009.01)
  *H04W 24/10* (2009.01)
  *H04W 24/06* (2009.01)

(52) U.S. Cl.
  CPC ........... *H04W 24/02* (2013.01); *H04W 24/10* (2013.01); *H04W 24/06* (2013.01)

(58) Field of Classification Search
  USPC .......................................... 455/411; 370/338
  See application file for complete search history.

(56) References Cited

U.S. PATENT DOCUMENTS

| | | | |
|---|---|---|---|
| 2015/0092579 A1* | 4/2015 | Li | H04W 24/10 370/252 |
| 2015/0341838 A1* | 11/2015 | Pinheiro | H04W 28/0231 455/449 |

OTHER PUBLICATIONS

3GPP TS 32.321 V13.0.0 (Jan. 2016), "3rd Generation Partnership Project; Technical Specification Group Services and System Aspects; Telecommunication management; Test management Integration Reference Point (IRP); Requirements" (Release 13), total 11 pages.

3GPP TS 32.322 V13.0.0 (Jan. 2016), "3rd Generation Partnership Project; Technical Specification Group Services and System Aspects; Telecommunication management; Test management Integration Reference Point (IRP); Information Service (IS)" (Release 13), total 30 pages.

3GPP TS 32.326 V13.1.0 (Jun. 2016), "3rd Generation Partnership Project; Technical Specification Group Services and System Aspects; Telecommunication management; Test management Integration Reference Point (IRP): Solution Set (SS) definitions" (Release 13), total 32 pages.

International Search Report dated Mar. 15, 2017 in corresponding International Patent Application No. PCT/EP2016/066569 (7 pages).

Written Opinion of the International Searching Authority dated Mar. 15, 2017 in corresponding International Patent Application No. PCT/EP2016/066569 (9 pages).

* cited by examiner

AUTOMATIC CONFIGURATION TESTING AND VERIFICATION OF A COMMUNICATION NODE

CROSS-REFERENCE TO RELATED APPLICATIONS

This application is a continuation of International Application No. PCT/EP2016/066569, filed on Jul. 12, 2016, the disclosure of which is hereby incorporated by reference in its entirety.

TECHNICAL FIELD

The aspects of the present disclosure relate generally to wireless communication systems and more particularly to configuring an access node in a wireless communication system.

BACKGROUND

Today's installation of 2G/3G/4G base stations requires that the base station is connected to the core network. In 2G and 3G, upon deployment the configuration of base stations required a vehicle equipped with an extended and powerful user node (UNd) device, driving in the entire service area to collect measurements. Based on the collected measurements, operators could derive received power levels, coverage maps, outage and other performance parameters. Adjustments were performed manually and required additional drive tests. The installation and configuration process requires days and months.

In 4G, a set of technical solutions have been specified under the umbrella name "minimization of drive tests" (MDT) where user node devices are exploited to perform measurements to test and adjust base station configurations. In both 3G and 4G the initial configuration of a base station was based on a default setting predetermined by the manufacturer (as derived from simulations). Furthermore, base stations were trusted and technologically homogeneous i.e., they all had the same capabilities since they belonged to the same product series of a single manufacturer. Based on prior knowledge of a radio node's capabilities, configuration for inter-node operation was anticipated and simplified. In dense network deployments such as those on lampposts and street lights, it is expected that the deployment will be done incrementally, or with an increasing population density resulting in nodes that may not be technically homogeneous. Also nodes may be replaced and/or reactivated in the case of area reconstructions or damages caused by labor or traffic accidents.

For testing purposes the primitives for the execution of testing are generic and aim at testing only the operation of the tested radio node. These primitives assume in advance the radio node's capability and functions therefore they neither define the test context and scenario for the testing, nor the automatic verification of the radio nodes. It would be advantageous to be able to provide a scalable mechanism that allows an operator to verify the capabilities of a radio node to operate as an access node by means of test context based on a method/protocol that facilitates automatic configuration and operation testing with the participation of other radio nodes and a minimum manual effort.

Accordingly, it would be desirable to provide an apparatus and method that addresses at least some of the problems identified above.

SUMMARY

It is an object of the present invention to automatically configure and test a radio node in a wireless communication system. This object is solved by the subject matter of the independent claims. Further advantageous modifications can be found in the dependent claims.

According to a first aspect of the present invention the above and further objects and advantages are obtained by a controller node for a wireless communication system. The controller node includes a processor configured for operating the controller node in a configuration test context, wherein the processor is configured to transmit at least one configuration test message to at least one first radio node and at least one second radio node, the configuration test message including at least one configuration test setting and at least one operational setting, receive a test report from the at least one first radio node and the at least one second radio node indicating at least one result of at least one configuration test of the configuration test context, determine from the test report a capability of the at least one first radio node to operate as an authorized and verified radio node in the wireless communication system, and transmit the capability to the at least one first radio node that the at least one first radio node (104) is an authorized and verified radio node. The aspects of the disclosed embodiments provide for automatically verifying the configuration and capabilities of a radio node.

In a first possible implementation form of the controller node according to the first aspect the controller node is configured to identify a next configuration test setting and a next operational setting from a configuration testing and verification list, map the next configuration test setting and the next operational setting to the configuration test message to be transmitted to the at least one first radio node and the at least one second radio node for performing the at least one configuration test. The controller node is configured to establish a test context and coordinate and control the operation of the radio nodes within the test context.

In a second possible implementation form of the controller node according to the first aspect as such or according to the first possible implementation form of the first aspect the controller node is configured to determine the capability of the at least one first radio node to operate as an authorized and verified radio node by identifying at least one score value in the test report for the at least one configuration test, verifying a configuration parameter associated with the at least one configuration test if the at least one score value indicates a successful completion of the at least one configuration test and mapping the verified configuration parameter to an authorized operation of an access node, wherein the mapping identifies the capability of the at least one first radio node to operate as an authorized and verified radio node. The controller node is configured to automatically test a configuration of a radio node in a test context and determine the suitability of the radio node as an authorized and verified radio node.

In a third implementation form of the controller node according to the first aspect as such or according to any one of the preceding possible implementation forms of the first aspect prior to transmitting the configuration test message to the at least one first radio node, the controller node is configured to receive a request from the at least one first radio node, as an unauthorized and unverified radio node, for authorization and verification as an authorized and verified radio node in the wireless communication system. The aspects of the disclosed embodiments allow for the testing and verification of the configuration of any radio node. Only an unauthorized and unverified radio node will be configured as an authorized and verified radio node.

In a fourth possible implementation form of the controller node according to the first aspect as such or according to any one of the preceding possible implementation forms of the first aspect the controller node is configured to transmit an authorization and verification message to the at least one first radio node to enable the at least one first radio node to operate as an authorized radio node in the wireless communication system. The aspects of the disclosed embodiments allow the controller node to determine that a radio node is configured to operate as an authorized radio node and enable the radio node to operate and an authorized and verified radio node.

In a fifth possible implementation form of the controller node according to the first aspect as such or according to any one of the preceding possible implementation forms the at least one operational setting is at least one of a transmission power, a clock synchronization setting, a transceiver setting or a processing capability setting.

In a sixth possible implementation form of the controller node according to the first aspect as such or according to any of the preceding possible implementation forms of the first aspect the controller node comprises the at least one second radio node. Any one of the radio nodes in the wireless communication network can assume the responsibilities and operations of a controller node.

According to a second aspect of the present invention the above and further objects and advantages are obtained by a first radio node for a communication system the first radio node comprising a processor configured for operating the first radio node in a configuration test context, the processor configured to receive a configuration test message, the configuration test message including at least one configuration setting and at least one operational setting for operating the first radio node, operate, during a configuration test, at least one radio resource, at least one network element, at least one communication function, and a protocol associated with the first radio node based on the at least one configuration test message and the at least one operational setting, cause the first radio node to communicate with at least one second radio node identified in the configuration test message during the configuration test for determining at least one result of the operation of the one or more of the at least one radio resource, the at least one network element, the at least one communication function, and the protocol associated with the first radio node based on the at least one configuration test message and the at least one operational setting, and transmit a reply message with the at least one result of the operation of the first radio node. The aspects of the disclosed embodiments provide for automatically verifying the configuration and capabilities of a radio node.

In a first possible implementation form of the first radio node according to the first aspect as such the first radio node is configured to receive an authorization that the first radio node is an authorized and verified radio node. The aspects of the disclosed embodiments provide for automatically verifying the configuration and capabilities of a radio node as an authorized and verified radio node.

In a second possible implementation form of the first radio node according to the second aspect as such or according to the first possible implementation form of the second aspect the first radio node is an unauthorized and unverified radio node and the first radio node is configured to transmit a request to a controller node for authorization and verification as an authorized and verified radio node in the communication system. The aspects of the disclosed embodiments for automatically determining that an unauthorized and unverified radio node is configured to operate as an authorized and verified radio node.

In a third possible implementation form of the first radio node according to the second aspect as such or according to any of the preceding possible implementation forms of the second aspect the processor is configured to determine if a result of the operation of the first radio node in the configuration test using the at least one operational setting is at a pre-determined value, identify a next operational setting of the at least one operational setting if the result of the operation is not at the pre-determined value, operate the first radio node in at least one next configuration test using the next operational setting and report a value of the operational setting to the controller node in the reply message when the result of the operation of the first radio node is at the pre-determined value. The aspects of the disclosed embodiments provide for operating the radio node in a test configuration according to a set of tasks to be achieved and report a result of the execution of the set of tasks.

In a fourth possible implementation form of the first radio node according to the second aspect as such or according to any one of the preceding possible implementation forms of the second aspect the processor is configured to cause the first radio node to send a configuration test ready message to the controller node after enabling the configuration test context. The aspects of the disclosed embodiments enable the controller to instruct the first radio node to operate certain functions according to certain parameters in a test mode.

In a fifth possible implementation form of the first radio node according to the second aspect or according to any one of the preceding possible implementation forms of the second aspect the first radio node is configured to receive a configuration test release after communicating the result of the operation of the first radio node in the reply message to the controller node and exit the configuration test context. The aspects of the disclosed embodiments enable a radio node to simultaneously operate in both a test and operation mode. When a test is complete, the radio node can resume normal operations.

According to a third aspect of the present invention the above and further objects and advantages are obtained by a communication system comprising a controller node, at least one first radio node and at least one second radio node, the controller node configured to transmit at least one configuration test message to the at least one first radio node and to the at least one second radio node, the configuration test message including at least one configuration setting for at least one configuration test context of the at least one first radio node and the at least one second radio node and at least one operational setting for operating the at least one first radio node and the at least one second radio node in the test configuration context during a configuration test, the configuration test message configured to enable the configuration test context for operation of one or more of at least one radio resource, at least one network element, at least one communication function, a protocol associated with the at least one first radio node and the at least one second radio node, the at least one first radio node and the at least one second radio node configured to operate in a configuration test of the test configuration context using the at least one operational setting, the at least one first radio node configured to transmit a reply message with at least one result of the operation of the at least one first radio node in the configuration test and the at least one second radio node configured to transmit a reply message with at least one result of the operation of the at least one second radio node in the configuration test, and the at least one first radio node configured to receive an authorization message that the at least one first radio node is an authorized and verified radio node. The aspects of the disclosed embodiments provide for automatically verifying the configuration and capabilities of a radio node in a wireless communication system to operate as an authorized and verified radio node as well as enable the radio node to operate as an authorized and verified radio node.

In a first possible implementation form of the system according to the third aspect as such the controller node is configured to receive the result of the operation of the at least one first radio node in the configuration test context, determine if a pre-determined test result is met, and if not, transmit at least one other configuration test message to one or more of the at least one first radio node and the at least one second radio node, the at least one other configuration test message including at least one other operational setting for operating the at least one first radio node and the at least one second node in the test configuration context during at least one next configuration test. The aspects of the disclosed embodiments provide for the automated testing of the configuration and capabilities of a radio node to determine if the radio node is configured to operate as an authorized and verified radio node in the wireless communication system.

In a second possible implementation form of the system according to the third aspect as such or according to the first possible implementation form of the third aspect the controller node is configured to determine a capability of the at least one first radio node to operate as an authorized and verified radio node by identifying at least one score value in the test report for the at least one configuration test verifying a configuration parameter associated with the at least one configuration test if the at least one score value indicates a successful completion of the at least one configuration test and mapping the verified configuration parameter to an authorized operation of an access node, wherein the mapping identifies the capability of the at least one first radio node to operate as an authorized and verified radio node. The aspects of the disclosed embodiments enable the operation of the radio node in the test context to be compared against a known configuration parameter to determine whether the radio node is configured to operate as an authorized and verified radio node.

In a third possible implementation form of the system according to the third aspect as such or according to anyone of the preceding possible implementation forms of the third aspect prior to transmitting the configuration test message to the at least one first radio node, the at least one first radio node being an unauthorized and unverified radio node, the at least one first radio node is configured to transmit a request for verification and authorization as a verified and authorized radio node in the communication network. The aspects of the disclosed embodiments enable the configuration testing of both authorized and verified radio nodes and unauthorized and unverified radio nodes. Unauthorized and unverified radio nodes will desire to be authorized and verified.

According to a fourth aspect of the present invention the above and further objects and advantages are obtained by a second radio node, the second radio node being configured to receive at least one configuration test message from a controller node according to any one of the preceding possible implementation forms, operate, during a configuration test, at least one radio resource, at least one network element, at least one communication function, and a protocol associated with the second radio node based on the at least one configuration test message, communicate with at least one first radio node according to any one of the preceding possible implementation forms identified in the at least one configuration test message during the configuration test using the at least one radio resource, the at least one network element, the at least one communication function, and the protocol associated with the second radio node based on the at least one configuration test message, and transmit a reply message to the controller node with at least one result of an operation of the at least one radio resource, the at least one network element, the at least one communication function, and the protocol associated with the second radio node based on the at least one configuration test message and the communication with the at least one first radio node. The aspects of the disclosed embodiments provide for automatically verifying the configuration and capabilities of a first radio node in a wireless communication system using at least one second radio node in the system. The second radio node is configured in the test context and can receive signals from, and send signals to, the first radio node to determine the configuration and capabilities of the first radio node.

In a first possible implementation form of the fourth aspect as such, the second radio node is configured to communicate with at least one other second radio node identified in the configuration test message during the configuration test using the at least one radio resource, the at least one network element, the at least one communication function, and the protocol associated with the second radio node based on the at least one configuration test message; and transmit the reply message to the controller node with at least one result of an operation of the one or more of the at least one radio resource, the at least one network element, the at least one communication function, and the protocol associated with the second radio node based on the at least one configuration test message and the communication with the at least one other second radio node.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
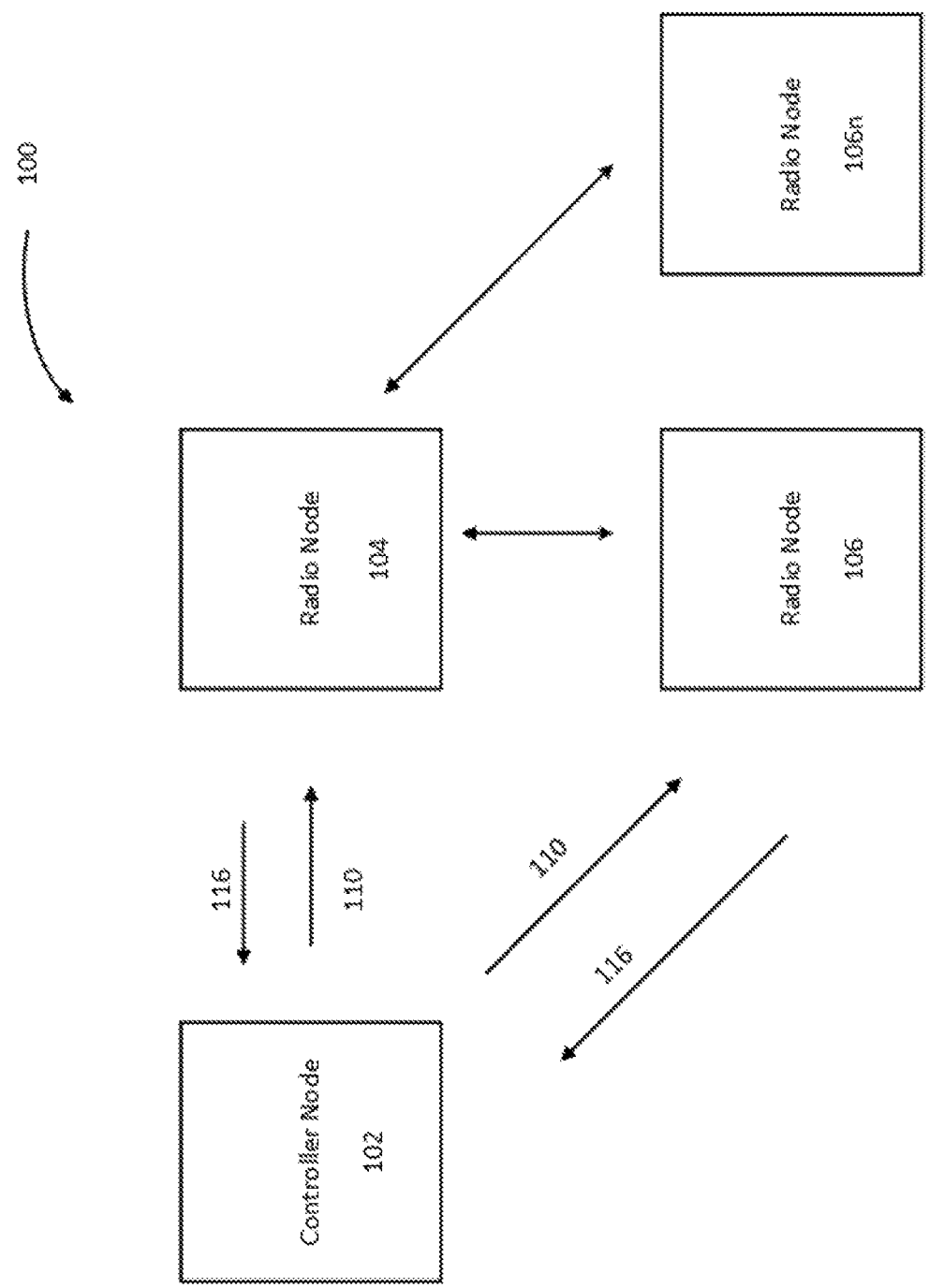
FIG. 1 illustrates a block diagram of a communication system incorporating aspects of the disclosed embodiments.

Referring to FIG. 1 there can be seen an exemplary block diagram of a wireless communication system 100 incorporating aspects of the disclosed embodiments. The aspects of the disclosed embodiments provide for the automation of the configuration and testing of any device as an access node (ANd), where the device comprises a radio node (RNd) equipped with a radio transmitter and a receiver. The configuration and testing may be coordinated by a controller node (CNd) or other access nodes and user nodes within an access network (ANw) of a network operator (NO). The configuration and testing automation can include the identification and automatic connection of a radio node to a controller node, the protocol that allows the configuration of a radio node from/to an access node at any time, procedures for the testing the operational capabilities of a radio node including for example clock testing, power testing, and transmitter/receiver testing, authorization and verification of a radio node as an access node based on challenge tests of the capabilities of the radio node and the coordination of existing access nodes for the configuration and testing of a new access node.

The term "radio node" as that term is used herein, generally includes any suitable type of communication node, including user nodes and access nodes. A "radio node" will generally include a receiver and a transmitter. The radio node may also include a processor or processing device, as will be described herein. An "authorized and verified" radio node is a node that is configure and enabled to operate as an access node. The aspects of the disclosed embodiments provide a scalable mechanism that allows an operator to authorize and verify the capabilities of a radio node, such as the first radio node 104 in FIG. 1, to operate as an access node by means of test context based on a method/protocol that facilitates automatic configuration and operation testing with the participation of other radio nodes, such as radio node 106, with a minimum manual effort.

Referring to the example of FIG. 1, in one embodiment, the wireless communication system 100 generally includes a controller node 102, at least one first radio node 104 and at least one second radio node 106. For the purposes of the description herein, the at least one first radio node 104, meaning that there can be one or more first radio nodes 104, will be referred to as "the first radio node 104". The at least one second radio node 106, meaning that there can be one or more second radio nodes 106, will be referred to as "the second radio node 106".

In the example of FIG. 1, the controller node 102 is configured to transmit at least one configuration test message 110 to the at least one first radio node 104. The configuration test message 110 generally includes a request for configuration testing that indicates the testing specifics in the configuration test message 110. Generally, the testing specifics will identify the configuration setting to be tested, which can include specifics such as transmission power, clock (synchronization) settings, transceiver settings, and processing capability settings. The testing specifics may also include performance and conformance related tests to determine that the hardware capabilities of the first radio node 104 are sufficient for the first radio node to operate as an access node. These performance and conformance related tests may be configured to test the drift of the clock of the first radio node 104 over time, the accuracy of the transmission frequency and the spectrum emission of the transmitter of the first radio node 104. These tests can be useful to determine whether the first radio node 104 fulfills the requirement to function properly as an access node. The tests can also be used to determine whether there are constraints on the operation of the first radio node 104, such as for example how frequent synchronization messages the first radio node 104 might need to receive, or which transmission power can be used without causing too much adjacent channel interference. The advantage of this procedure is that it allows for the controller node 102 to create a list of capabilities for the first radio node 104 that can be used to coordinate its operation with existing access nodes, such as the second radio nodes 106.

Advantageously, the aspects of the disclosed embodiments allow the controller node 102 to identify the capabilities of the first radio node 104 as a potential access node without any prior knowledge of the device. The aspects of the disclosed embodiments may also be used to implement access nodes using software defined radio (SDR) technology, where the performance of the hardware platform may not be accurately known in advance. A further advantage is that any radio node, such as the first radio node 104, even if it is primarily a user node, can be occasionally tested and configured as an access node. The first radio node 104 may also be tested when new software is installed. As will be described further herein, the first radio node 104 can be set in the test mode and tested with other second radio nodes 106 that may have different software and/or hardware implementations to ensure the compatibility therein.

In one embodiment, the at least one configuration test message 110 that is sent from the first radio node 104 and the second radio node 106 will include at least one configuration test setting and at least one operational setting. A configuration test setting generally refers to the test context or environment in which the first radio node 104 and the second radio node 106 will be operating during the configuration testing. For example, the configuration test settings can include, but are not limited to, the radio resources to be used by the first radio node 104 and the second radio node 106 to perform the configuration testing. Radio resources can include for example, the frequencies, time, code resources related to wireless data transmission.

The configuration test settings can also include the network elements and network nodes to be used to perform a configuration test and their role in the testing. For example, the configuration testing message 110 from the controller node 102 may contain indications about at which time and frequency resources the testing transmission/reception will be performed, how many transmitting/receiving antennas will be used and which kind of pre-coding, and transmitter/receiver will be utilized. The configuration test settings can also include or designate other radio nodes that will participate in the configuration testing, such as the second radio node 106. The network elements generally refer to the antennas, the antenna elements, the radio frequency (RF) and baseband (BB) units to be employed by the first radio node 104 and the second radio node 106 during the configuration testing.

The configuration test settings can also identify the communication functions and protocols that define functional elements for the operation to be employed by the first radio node 104 and the second radio node 106 for the configuration testing. The communication functions and protocols refer to the functions related to the data transmission and control signaling.

In one embodiment, after the configuration test, the controller node 102 is configured to receive a test report 116 from one or more of the first radio node 104 and the second radio node 106. The test report 116 generally indicates the results of the configuration test of the radio node 104 in the configuration test context as set forth in the configuration test message 110. The results can include for example, but are not limited to performance parameters, performed actions, transmission/reception status, deviations and failures and other relevant information related to the operation of the radio node 104 during the configuration test.

The controller node 102 is configured to determine from the test report 116 a capability of the first radio node 104 to operate as an authorized and verified radio node in the wireless communication system 100. For the purposes of the description herein, an authorized and verified radio node will also be referred to as an access node. The controller node 102 is configured to transmit a message to the first radio node 104 that identifies the capability of the first radio node 104 to operate as an authorized and verified radio node, or an access node, in the wireless communication system 100.

The aspects of the disclosed embodiments test the configuration and operation of the first radio node 104 within a functionality and network context. A "test context" as that term is used herein generally refers to an operation scenario test which implies the coordination of one or multiple functions to achieve a certain network objective. The objective may be related to service or performance. The test context extends the testing not only to verify that the physical or functional resource of the first radio node 104 performs properly, but also to verify that the first radio node 104 performs within a test context as intended. In the case that the first radio node 104 does not perform as intended or is faulty, the first radio node 104 can provide all the information to help the operator to identify the cause and correct the fault.

The test context refers to a scenario testing which aims at identifying the functionality a first radio node 104 may support the network 100 with, and assess the functionality and performance of the first radio node 104. The advantage of testing a first radio node 104 within a test context is to identify the capabilities of the first radio node 104, evaluate its performance and assess the eligibility of the first radio node 104 to assist in certain functions of the network 100.

In one embodiment, the test context described herein can be is characterized by the radio resources to be used to perform the operation and configuration testing, the network elements and network nodes to be involved to perform the test and their role, the communications functions and protocols (that define functional elements for the operation) to be employed for the testing, the operation and configuration testing scenario within the test context, the reports on the results and other to be reported at test initiation, during the test and upon termination of the configuration.

The radio resources referred to above generally refer to the frequencies, time, and code resources related to wireless data transmission. The network nodes refer to the radio nodes that participate in the configuration testing, while the network elements refer to the antennas, the antenna elements, the RF and baseband (BB) units to be employed during the configuration testing. The communication functions and protocols refer to the functions related to the data transmission and control signaling. The test results refer to performance parameters, performed actions, transmission/reception status, deviations and failures and other relevant information related to the context characteristics.

The operation and configuration testing scenario generally corresponds to a testing manuscript that is a non-empty set of parameter settings and operations to be performed for the testing purposes. These settings and operations may be explicit or implicit. In the case of explicit testing scenarios the set may consist of one single or multiple instructions that should be orderly executed. An advantage of this explicit testing approach is that the operator may determine a testing manuscript (of instructions) and execute it to verify proper operation of the first radio node 104 within the defined context. For example, a simple test context is the transmission or reception of a beacon (defining the communication function), with a certain code sequence at certain frequency and time (defining the radio resources) by a certain antenna elements of a certain radio node (defining the network elements and node).

Within a test context, instructions are expressed in terms of the functional elements to be invoked and their assignments on input, output and control parameters. Parameters and functional elements refer to instantiations of context characteristics and their values to configuration settings and operations. One example of a single instruction (atomic instruction) within the test context of transmission or reception of a beacon would include the transmission (defining the function/functional element) of certain code sequence (defining the input parameter) at a certain transmission power (defining the control parameter). Another example of a single instruction within the same context would include the reception (defining the function/functional element) of certain code sequence (defining the output parameter) at a certain transmission power (defining the control parameter).

An example of a multi-step instructions (composite instructions) within the test context of protocol operation would be the reliable data transmission, for instance, by means of ARQ or HARQ, (defining the function/functional element) of certain data payload (defining the input and the output parameter) at a certain number of retransmission attempts (defining the control parameter).

In the case of an implicit testing scenario the testing manuscript does not explicitly list the configuration and operation steps as instructions, rather the testing manuscript lists a set of tasks to be achieved. For example, in order to test the clock stability of the first radio node 104, the first radio node 104 may perform frequent tests to derive an average clock value. In one embodiment, each task in this implicit testing scenario consists of a set of procedures that are performed by a set of configuration and operation functional elements, henceforth functions, which assign values on a set of configuration and operation parameters, henceforth parameters. The execution of the functions is triggered on parameter assignments and assignment changes. Once a parameter has been assigned a new value this information is delivered to the task, which automatically triggers the execution of any function that uses that parameter as its input. The set of parameters and their assignments characterize and define at any one time the test state of the system.

Figure 2:
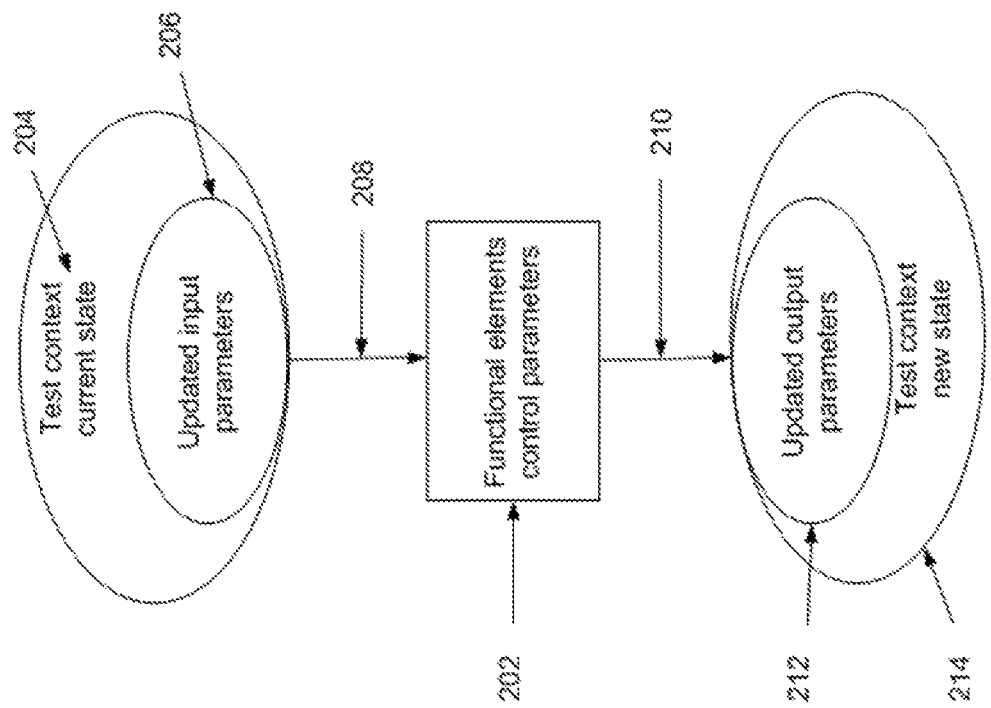
FIG. 2 is a schematic illustration of task based configuration and operation testing incorporating aspects of the disclosed embodiments.

The execution of a function may imply test state transition. FIG. 2 shows a schematic illustration of one embodiment of task based testing. In this example, a set 202 of functional elements and control parameters is defined. The set 202 includes one or more functions and their control parameters characterizing configuration and operation settings that facilitate state transitions are defined.

The test context current state 204 includes a set or sub-set of parameters and their assigned values characterizing radio resources, network nodes and elements, and performance results, amount other parameters. The updated input parameters 206 include a sub-set of the parameters associated with a test configuration and operation function, if it constitutes the input or output parameters of that function. A new assignment or reassignment of one or more of the input associated parameters triggers 208 the execution of the associated function.

The execution 210 of a function from the set 202 of functional elements or control parameters may result in a set 212 of updated output parameters reassignment of one or more parameters in the current state, implying the transition to a new (intermediate or final) test context state 214.

Figures 3, 4:
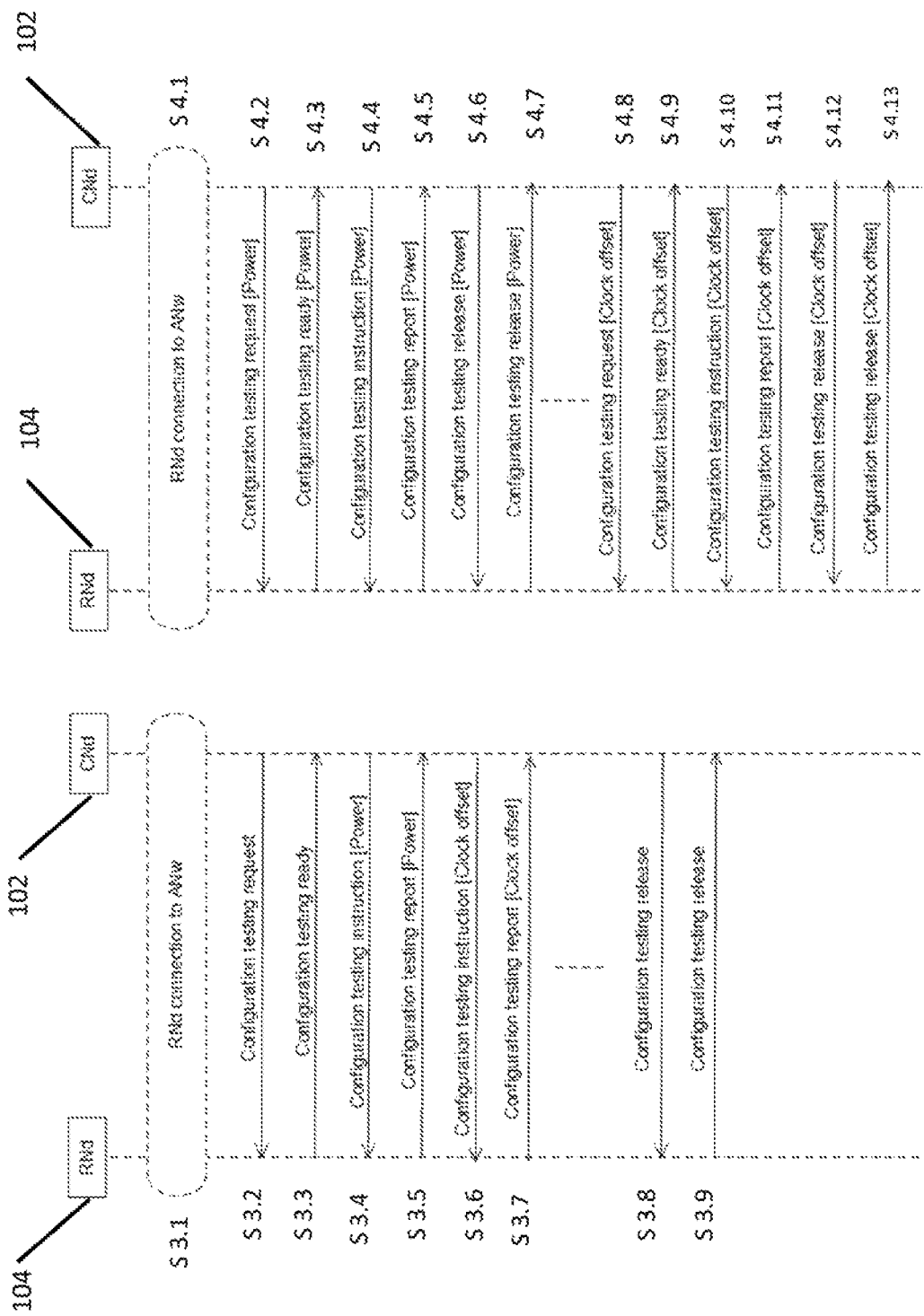
FIGS. 3 and 4 are schematic diagrams of exemplary configuration testing procedures incorporating aspects of the disclosed embodiments.

In one embodiment as is shown in FIG. 3, a configuration and operation testing request, also referred to herein as the configuration test message 110, conveys test context information as described above with reference to FIGS. 1 and 2. Upon reception of the configuration test message 110, the first radio node 104 enters a test mode operation of the functions defined in the test context. The first radio node 104 tunes to the frequency resources, time instance, functions etc. characterizing the requested test and enters a test state as a tester or tested node. Each first radio node 104 has the required knowledge about the identity of the second radio nodes 106 it will interact with within the test context as well as its own and the others' roles in the test.

In the example of FIG. 3, the first radio node 104 receives a configuration test request S3.2 from the controller node 102. The first radio node 104 replies with a configuration and operation testing ready message S3.3 with its configuration settings. The configuration and operation instruction request S3.2 comprises the testing scenario instructions, one or many, to be performed for the testing. One advantage of this is that the first radio node 104 may operate in a test mode only on a subset of the radio resources and employ only certain network and node elements while being at full regular operation. This way any first radio node 104 or second radio node 106 may simultaneously be in both test and operation mode. The second radio nodes 106 that may participate in a testing procedure can be access nodes and user nodes.

The testing procedure of the disclosed embodiments can depend on the capabilities of the first radio node 104. These capabilities can include for example the specification release the first radio node 104 implements, the software release the first radio node 104 runs and which features the first radio node 104 supports. In one embodiment, this capability information can be collected from a database that the controller node 102 has access. Alternatively, the capability information can come directly from the first radio node 104 during the initial test operation initiation. The test procedures as are generally described herein would then be targeted at verifying the functionality that is associated with the supported features.

In the example of FIG. 3, the first radio node 104 connects S3.1 to the access or communication network 100. The testing process is generally preceded by the controller node 102 sending S3.2 a configuration testing request to signal the configuration testing specifics. As noted above, the configuration test request S3.2 can include indications about at which time and frequency resources the testing transmission/reception will be performed, how many transmitting/receiving antennas will be used, and which kind of pre-coding and transmitter/receiver will be utilized. The configuration testing request S3.2 can also indicate whether an acknowledgement of every power configuration testing should be sent to the controller node 102 specifying the start time, end time and the configuration setting value applied. For example, the controller node 102, or another access node, may instruct the first radio node 104 to send a certain signal, in a certain frequency, in a certain time period, in which at each period step the first radio node 104 would increase the transmission power by 1 dB starting from 25 dBm and stopping at 30 dBm.

In one embodiment, the configuration testing request comprises the at least one configuration test message 110 described above and optionally the testing period. As will be understood, the at least one configuration test message 110 can comprise a single message, or multiple message in order to provide the first radio node 104 and second radio node 106 with the configuration test setting parameters and operation settings as are generally described herein.

In one embodiment, the connection S3.1 of the first radio node 104 to the access network 100 can include the first radio node 104 sending a configuration test request to the controller node 102 to indicate the availability of the first radio node 104 to operate as an access node in the network 100. This advantageously allows any device, including a user node (UN) for example, to occasionally operate as an access node, assuming the device passes the testing configuration tests. As opposed to conventional testing procedures, an advantage of this procedure is that a potential access node, such as the first radio node 104, may be tested not only according to its capabilities, but also in accordance with how useful it would be in certain environments.

For example, it can be useful to configure a user node or a software defined radio node as an access node to relay data to nearby user nodes, such as around a corner, thus avoiding occasionally signal attenuation due to diffraction. In another example a user node may be configured as an access node to improve signal reception diversity. As will be described below, in one embodiment, all configuration tests are recorded to a knowledge database that is maintained by an operation and management (O&M) server, such as the O&M server 108 shown in FIG. 5. The advantage is that it is possible to maintain a list of capabilities of a radio node for future use.

Referring again to FIG. 3, upon reception of the configuration test message 110, in one embodiment, the first radio node 104 replies with a configuration testing ready message S3.3 to indicate that the first radio node 104 has entered a testing mode of operation. The advantage of this is to prepare the first radio node 104 to perform the testing instructions from the configuration test message 110 that the first radio 104 has received or that will follow. In one embodiment, operating the first radio node 104 following the testing instructions is done only if the first radio node 104 has entered a testing mode of operation.

In one embodiment, the reply of the first radio node 104 with the configuration test ready message S3.3 to the controller node 102 can also indicate potential limitations on the use of the resources of the first radio node 104. These limitations can include for example, limitations on the frequencies on which the first radio node 104 can operate, or the number of transmitting/receiving antennas the first radio node 104 can use, or potential limitations in the power interval that the first radio node 104 can transmit at. In some embodiments it may be preferred to test part of the functionality in license exempt frequency bands, to minimize the possible interference on the licensed frequency bands.

In one embodiment the testing procedure can starts by testing that the first radio node 104 can switch itself off, or at least its radio transmission when requested by the controller node 102. This can be used to ensure that the first radio node 104 can be switched off in case it is found to misbehave during the test procedure. The functionality to switch off the first radio node 104 may be provided by an external entity, for example a hypervisor for virtualized network functionalities, or by a power socket/power supply that is controlled by the controller node 102 (e.g. via the same or a different wireless communication network).

Referring to FIG. 3, the controller node 102 then send a configuration testing instruction S3.4 to the first radio node 104. Although the configuration testing instruction S3.4 is described herein as a separate instruction, in one embodiment, the configuration testing instruction is part of the configuration test message 110. In this example, the configuration testing instruction S3.4 relates to a power parameter of the first radio node 104 and can include an instruction for the first radio node 104 to operate on a certain frequency and at a certain power level. For example, the configuration testing request S3.2 may initiate testing of the power setting of the first radio node 104 where the first radio node 104 is instructed in the power configuration test instruction S3.4 to transmit both in the uplink (UL) and downlink (DL) at certain power level (specified in dBm or linearly) or following a certain power transmission pattern specified by the power interval, the size of the power increase steps and the unity metric used (e.g, dBm or linear). The power interval may indicate the lower and the upper power in the interval.

To execute the power configuration testing instruction S3.4, the first radio node 104 tunes to the frequency resources, time instance, functions characterizing the requested test and enters a test state as a tester or tested node. The first radio node 104 has the required knowledge about the identity of the second radio nodes 106 it will interact with, as well as the role of the first radio node 104 and the second radio node 106 in the configuration test. Upon completion of the power configuration testing instruction S3.4, the first radio node 104 sends a power configuration testing report S3.5 to the controller node 102 with a result of the test. One advantage of this process is that the first radio node 104 may operate in test mode only on a subset of the radio resources and employ only certain network and node elements while being at full regular operation. This way any first radio node 104 may simultaneous be in both test and operation mode.

As another example, the controller node 102 can send a clock offset configuration testing instruction S3.6 to the first radio node 104 for synchronization purposes. In one embodiment, the controller node 102 can indicate in the configuration test request S3.2 the clock offset the first radio node 104 should use for the transmission of a certain signal in the downlink and/or uplink. In another example the clock offset configuration testing instruction S3.6 sent by the controller node 102 may include a set of clock offsets in terms of discrete values (in Hz) or by means of an clock offset interval indicating an lower offset value, and upper offset value and the size of clock offset step increments. In one embodiment, the clock offset configuration testing request S3.6 from the controller node 102 may also indicate whether an acknowledgement of every clock offset configuration testing should be sent from the first radio node to the controller node 102 specifying the start time, end time and the configuration setting value applied.

For example, to test the clock stability of the first radio node 104 the controller node 102 may request the first radio node 104 to report its current time periodically during the test period. The time reports can be sent to the controller node 102 or to other nodes in the network, such as the second node 106, as will be described further below. In this example, the drift of the clock in the first radio node 104 relative to a reference clock in the controller node 102 or the second node 106 that receives the reported clock value is evaluated. The first radio node 104 conducts the clock offset test and sends a clock offset configuration test report S3.7 to the controller node 102.

Once all of the operational parameters have been tested in accordance with the configuration testing request S3.2, the controller node 102 sends a configuration test release message S3.8 to the first radio node 104. The first radio node 104 replies with a configuration testing release message S3.9 and exits the configuration test mode.

FIG. 4 illustrates another example of configuration testing of a radio node in accordance with the aspects of the disclosed embodiments. In the example of FIG. 4, the controller node 102 sends configuration test requests or messages 110 to the first radio node 104 to signal individual configuration testing periods. Rather than entering a test mode and executing a series of test instructions as was described in the example of FIG. 3, in this example, the first radio node 104 enters a test mode for each specific testing instruction, executes the testing instruction, sends the test report and then exits the test mode. The test mode may be labeled as general, that is "test mode", or specific, depending on the testing, that is "power test mode" for power testing, "clock test mode" for clock testing etc. In whichever case, concurrent testing instructions and test mode labels, if specific test mode labeling applies, are possible. An advantage of this is that a radio node may perform testing of some parts of the radio node while other parts are at full regular operation.

For example, after the radio node 104 connects S4.1 with the access network, the controller node 102 transmits a power configuration test request S4.2 to the first radio node 104. The power configuration test request S4.2 in this example can instruct the first radio node 104 to transmit both in the uplink (UL) and downlink (DL) at certain power level (specified in dBm or linearly) or following a certain power transmission pattern specified by the power interval, the size of the power increase steps and the unity metric used (e.g, dBm or linear). The power interval may indicate the lower and the upper power in the interval.

Upon reception of the power configuration test request S4.2, the first radio node 104 enters a test mode of operation and replies with the power configuration testing ready message S4.3 to indicate that it has entered a power testing mode of operation. The configuration testing ready message S4.3 sent by the first radio node 104 to the controller node 102 may indicate potential limitations in the power interval that the first radio node 104 can transmit at. The power configuration testing request S4.2 may also indicate whether an acknowledgement of every power configuration testing should be sent to the controller node 102 specifying the start time, end time and the configuration setting value applied.

The controller node 102 sends the power configuration testing instruction S4.4 to the first radio node 104. The first radio node 104 conducts the power configuration test and sends a power configuration test report S4.5 to the controller node 102. The controller node 102 sends the power configuration test release S4.6 to the first radio node 104. The first radio node 104 exits the power configuration test mode and sends the power configuration testing release message S4.7 to the controller node 102 to indicate that it has exited the power configuration test mode.

A similar process is detailed for testing the clock offset of the first radio node 104. The first radio node 104 receives a clock offset configuration testing request S4.8. The clock offset configuration testing request S4.8 can include the clock offset configuration test setting, such as for clock synchronization purposes. For example, the controller node 102 indicates in the clock offset configuration testing request S4.8 the clock offset the first radio node 104 should use for the transmission of a certain signal in the downlink and/or uplink. In another example the controller node 102 may send a set of clock offsets in terms of discrete values (in Hz) or by means of an clock offset interval indicating an lower offset value, and upper offset value and the size of clock offset step increments. The clock offset configuration testing request S4.8 from the controller node 102 may also indicate whether an acknowledgement of every clock offset configuration testing should be sent to the controller node 102 specifying the start time, end time and the configuration setting value applied.

Upon reception of the clock offset configuration testing request S4.8 the first radio node 104 enters a test mode of operation and replies with a clock offset configuration testing ready message S4.9 to indicate that the first radio node 104 has entered the clock offset testing mode of operation, such as that described above with respect to FIG. 3. The advantage of this is to prepare the first radio node 104 to perform the clock offset testing instructions that will follow.

The controller 102 send the clock offset testing instruction S4.10 to the first radio node 104. The first radio node 104 conducts the clock offset testing and sends a clock offset configuration testing report S4.11 to the controller node 102. The controller node 102 sends the clock offset configuration testing release S4.12 to the first radio node 104. The first radio node 104 exits the clock offset configuration testing mode and sends the clock offset configuration testing release S4.13 to the controller node 102 to indicate that it has exited the clock offset test mode.

For purposes of the description herein, only procedures related to the power parameters and clock offset of the first radio node 104 are illustrated. However, it will be understood that the processes shown in FIGS. 3 and 4 can be applied for any number of configuration specifics and operational parameters of the first radio node 104, other than including the power and clock offset.

Figure 5:
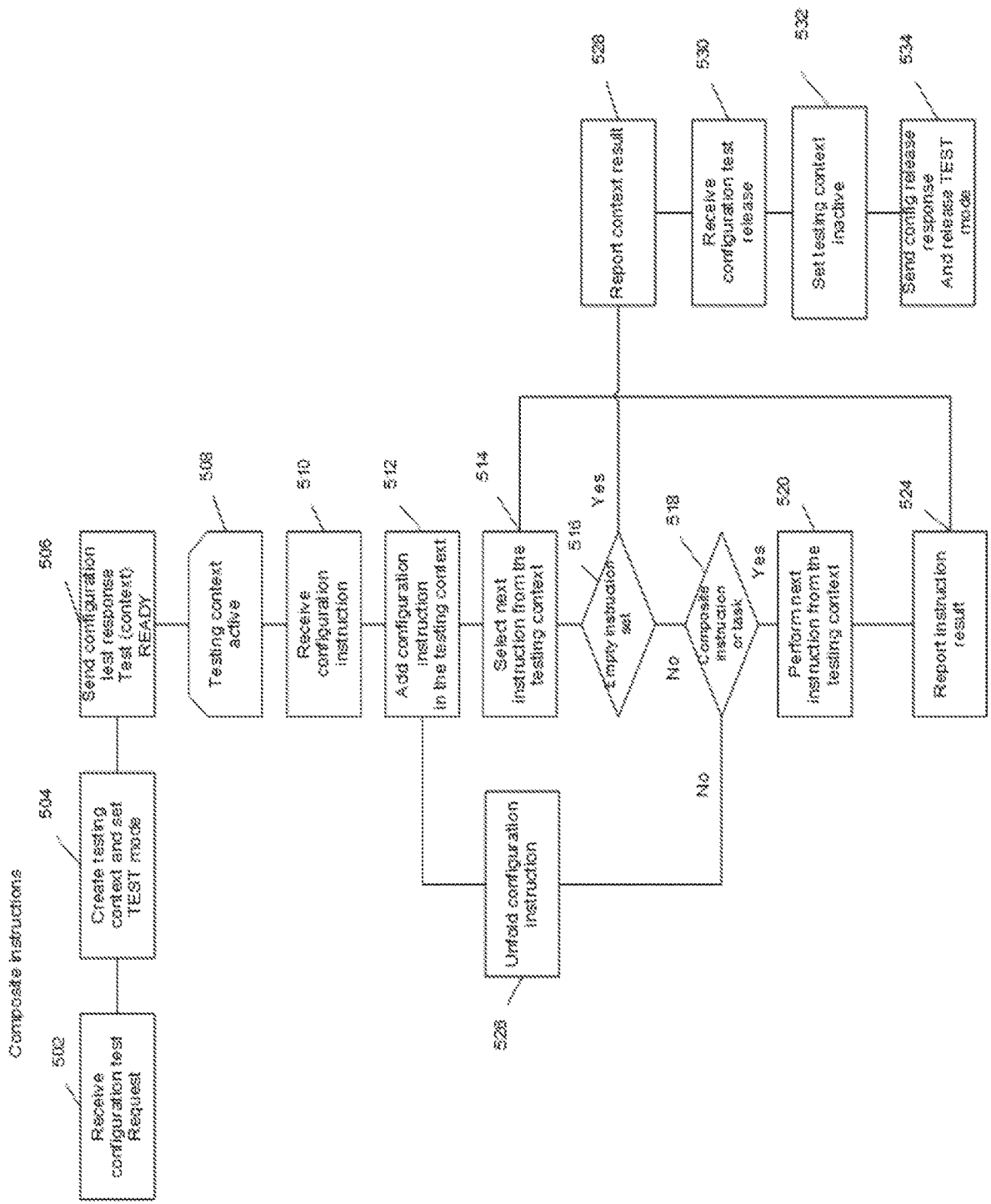
FIGS. 5 and 6 are schematic diagrams of exemplary explicit configuration testing procedures incorporating aspects of the disclosed embodiments.

FIG. 5 illustrates a flow chart of a configuration testing procedure incorporating aspects of the disclosed embodiments. In the example of FIG. 5, the explicit configuration test procedure is for composite instructions.

In this example, a configuration test request is received 502. A test context and test mode is created 504. The configuration test response that the test context is ready is sent 506. The testing content is active 508. The configuration instruction is received 510 and is added 512 to the testing context. The next instruction is selected 514 from the test context. It is determined 516 is the instruction is empty. If not, it is determined 518 is the next instruction is a composite instruction or task. If no, the configuration instruction is unfolded 526 and the configuration instruction is added 512 to the testing context. If yes, then the next instruction from the testing context is performed 520. The instruction result is reported 524.

If it is determined 516 that the instruction set is empty, the context result is reported 528. A configuration test release is received 530. The testing context is set 532 to inactive and a configure release response and test mode release is sent.

Figure 6:
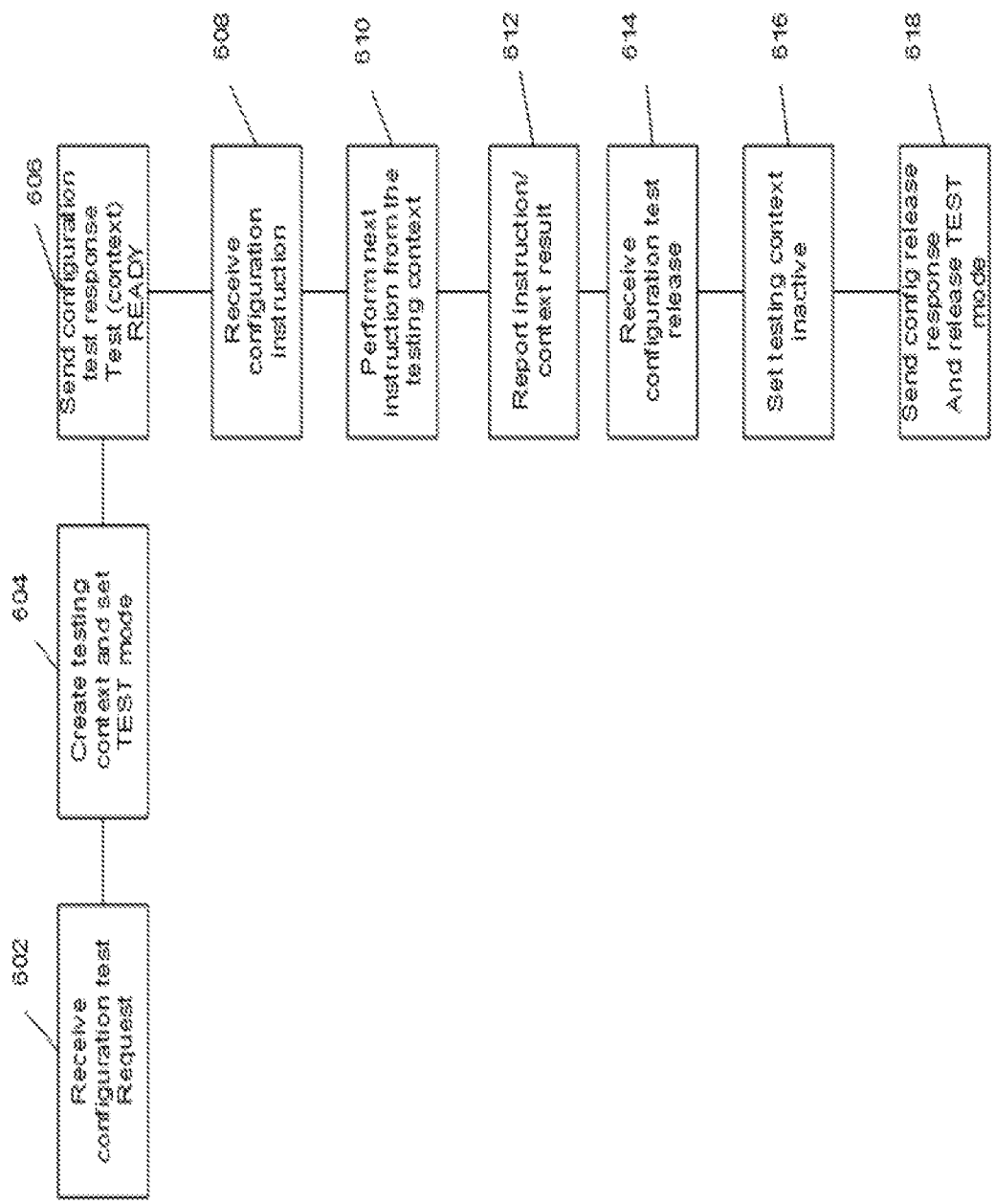

FIG. 6 illustrates one embodiment of an explicit configuration test procedure for atomic instructions. In this example, the configuration test request is received 602. The test context is created and test mode set 604. A configuration test ready response is sent 606. A configuration instruction is received 608. The next instruction from the testing context is performed 610 and the result of the instruction is reported 612. A configuration test release is received 614. The testing context is set to inactive 616. The configuration release response is sent and the test mode released 618.

Figure 7:
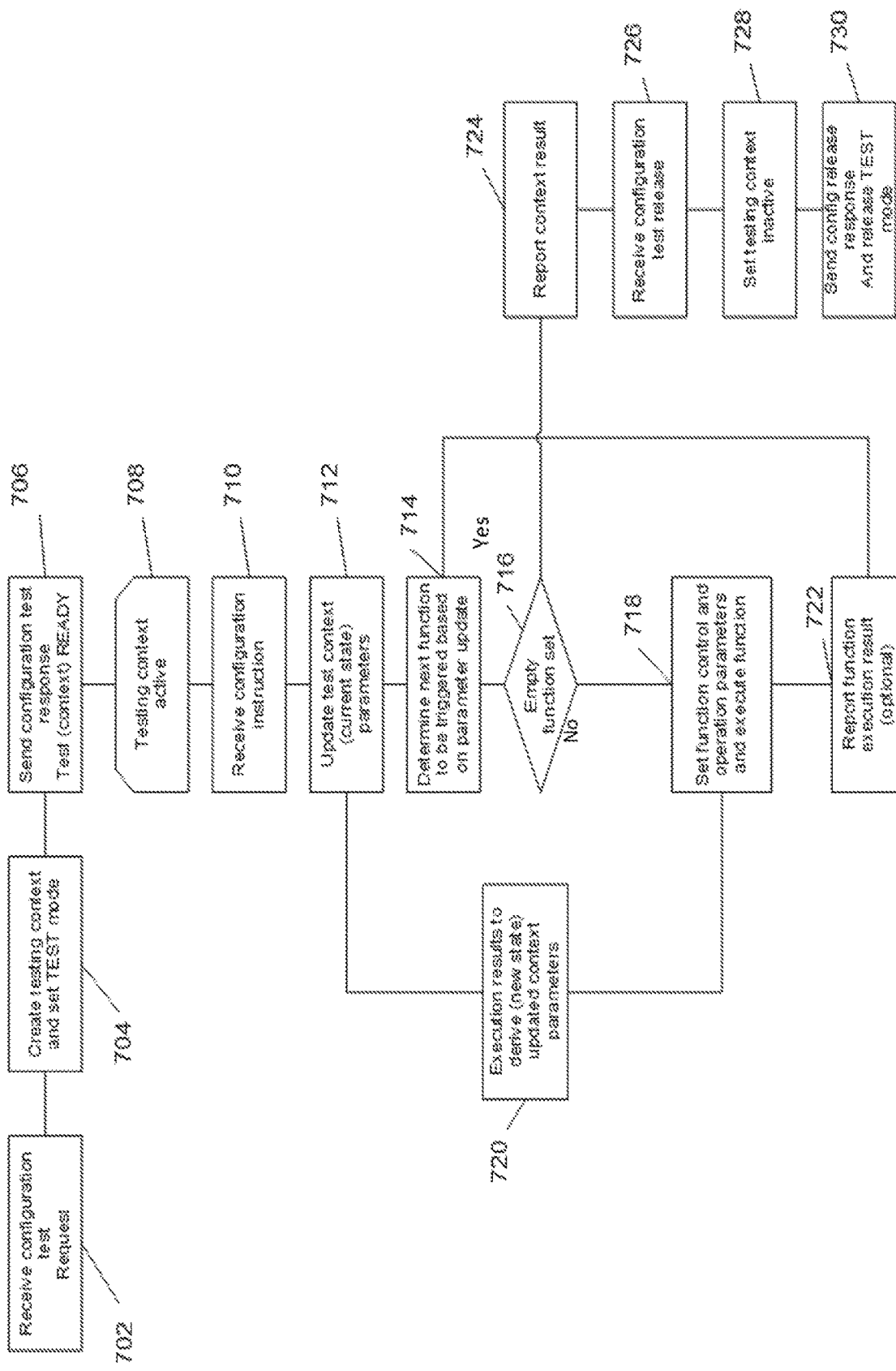
FIG. 7 is a schematic diagram of an exemplary implicit configuration testing procedure incorporating aspects of the disclosed embodiments.

FIG. 7 illustrates one example of a configuration testing procedure incorporating aspects of the disclosed embodiments for implicit instructions. In this example, the configuration test request is received 702. The testing context is created and test mode set 704. A configuration test ready response is sent 706. The testing context is active 708.

A configuration testing instruction is received 710. The current state of the parameters of the test context is updated 712 and the next function to be triggered based on the parameter update is determined 714. It is determined 716 whether the function set is empty. If the function set is not empty, the function control and operation parameters are set and the function executed 718. The execution results to derive a new state or updated context parameters are determined 720 and the test context parameters are updated 712. In one embodiment, the result of the function execution is optionally reported 722.

If it is determined 716 that the function set is empty, the context result is reported 724. The configuration test release is received 726. The testing context is set 728 to inactive and the configuration release response is sent and the test mode released 730.

In one embodiment, referring again to FIG. 1, the configuration testing may be performed by one or more second radio nodes 106, 106n that act in cooperation. For the purposes of the description herein, the one or more second radio nodes 106, 106n will generally be referred to as the "second radio node 106." Whether the testing is performed by one or more second radio nodes 106, 106n, the radio node that issues and transmits the configuration testing message 110 is the controller radio node 102. The controller node 102 is the radio node that coordinates the configuration testing and receives the responses or test reports from the first radio nodes 104 and the second radio nodes 106. The advantage of this is that it allows for distributed, robust and scalable solutions.

In another embodiment, the second radio nodes 106 can take turns in coordinating and acting as the controller node 102. The ordering for coordination may follow a round-robin pattern or a contention-based pattern. For example, in the contention-based pattern, when the controller node 102 finishes its tests, all waiting second radio nodes 106 set a back-off timer. The second radio node 106 whose back-off-timer expires first becomes the controller node 102 and sends a configuration testing message 110 to the first radio node 104. The configuration coordination proceeds until all second radio nodes 106 have acted as the controller node 102 and performed their configuration tests.

In another embodiment, the configuration testing procedures may involve the participation of one or more of the second radio nodes 106. The one or more second radio nodes 106 can receive the signals transmitted by the first radio node 104 or can transmit test signals to the first radio node 104 as instructed by the controller node 102.

In one example the one or more second radio nodes 106 receive a configuration testing message 110 from the controller node 102 where they are requested to participate as a tester radio node. Upon acceptance, the one or more second radio nodes 106 send a configuration testing ready response to indicate availability to participate as a tester radio node. The one or more second radio nodes 106 are then instructed to perform a test and report on it.

The configuration testing may in this example can include the one or more second radio node 106 transmitting on the uplink or the downlink a certain signal at a certain time and clock offset, at certain frequencies, and/or with certain pre-coding and power, etc. The configuration testing may also include the one or more second radio node 106 receiving a signal at certain time and clock offset, in certain frequencies, and/or with certain pre-coding and power etc.

Whether a second radio node 106 is a tester or under test, it is indicated in the configuration testing message 110 from the controller node 102 or another second radio node 106. The controller node 102 may coordinate testing of tester nodes and tested first radio nodes 104, collect and combine the configuration testing results to determine the configuration settings and capabilities of the first radio node 104.

In a further embodiment, the one or more second radio nodes 106 may cooperate and participate in a test context for the first radio node 104, constituting the actual context of the test. For example, the set of one or more second radio nodes 106 can provide the context within which the first radio node 104 can test the transmissions of multiple antenna elements. The transmissions may be formed by different number of antenna elements, be of different sizes of beam width and towards multiple directions. The configuration test may follow a certain set of settings and instructions that are sent to the first radio node 104 and the one or more second radio nodes 106 for the purpose of test synchronization. The test results 116 are then sent to the controller node 102 and/or the one or more second radio nodes 106 for further processing.

The advantage of the configuration test context is to enhance the testing to derive information that can be used to identify a more effective testing configuration. For example, different configurations of beam-forming may have an impact on the (level of) interference they may cause to different radio nodes, which could be severe when the radio nodes operate at different DL/UL ratios.

In an embodiment the one or more second radio nodes 106 can be used to test that the first radio node 104 implements correct protocol behaviors. For example, a second radio node 106 operating as a tester node can be configured to connect to the first radio node 104 under test using normal connection setup procedures. Test data can be sent to and from the tester second radio node 106 to confirm that the first radio node 104 is operating correctly. The controller node 102 may then trigger a handover to another one of the one or more second radio nodes 106.

To trigger the handover to another one of the second radio node 106 from the tester second radio node 106 that may not be optimal from a radio point of view, all the involved second radio nodes 106 may be configured as testing nodes. The tester second radio node 106 may be handed over back to the first radio node 104 under test to evaluate that the handover in both directions works well. The tester second radio node 106 may perform a handover multiple times with different configurations corresponding to first radio node 104 behavior in different specification releases and with different configuration of the QoS and mobility settings to confirm compatibility with different features.

Figure 8:
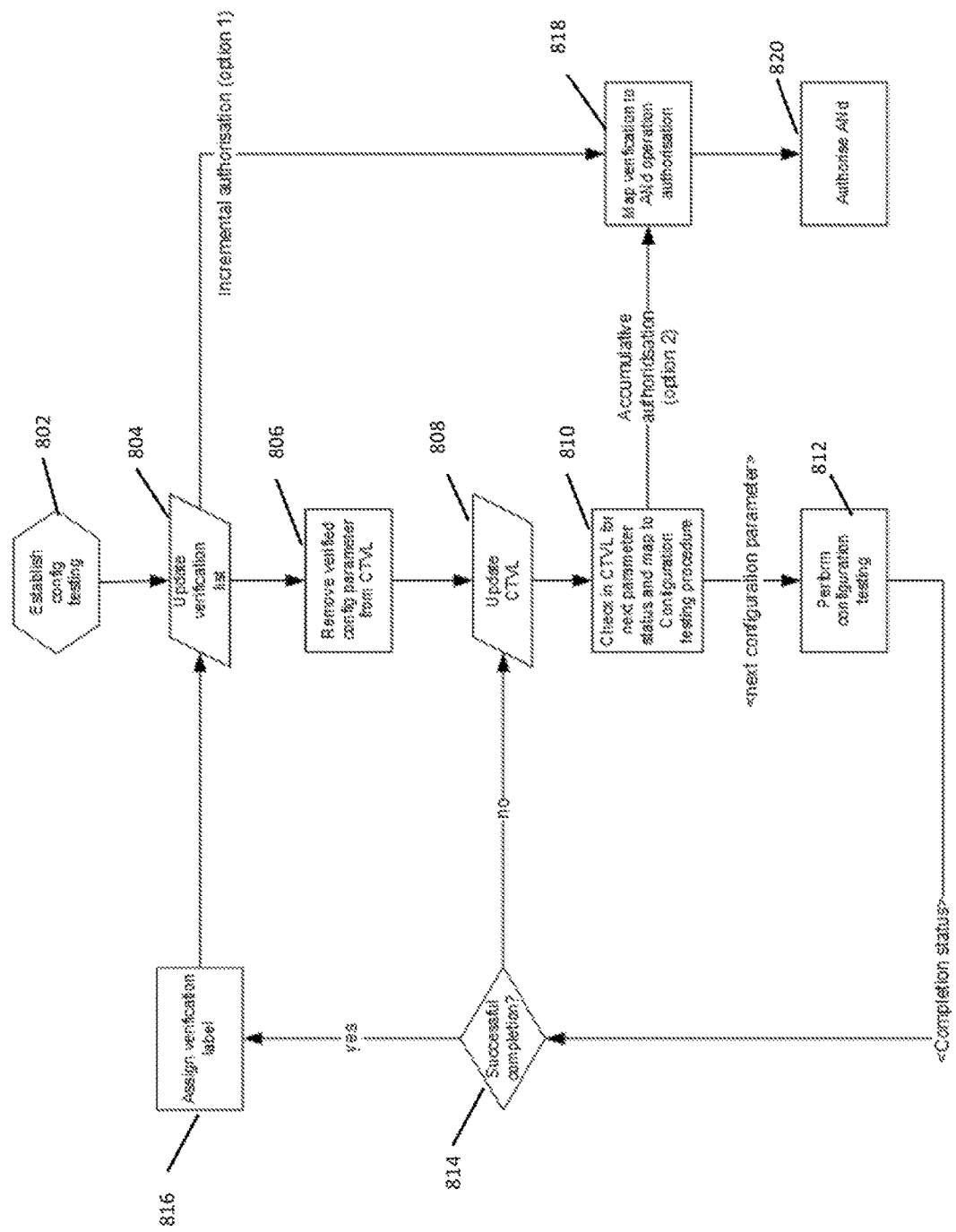
FIG. 8 is a schematic illustration of an exemplary authorization/verification and configuration testing flow.

Referring to FIG. 8, in one embodiment, the first radio node 104 may be verified for its capability to operate as a radio node with full or limited authorization on autonomous decisions ranging from a fully autonomous radio node to a radio node with limited decision scope and operations. For the purposes of the description herein, a radio node with full authorization will be referred to as an authorized and verified radio node or access node. A radio node with limited authorization will be referred to as a limited or partially authorized and verified radio node or access node. In one example limited operation implies, operation that is restricted, in power, frequency, time, pre-coding, or testing as a tester.

In one embodiment the first radio node 104 performs configuration testing to be verified to operate as an authorized and verified radio node. The ability to operate as an authorized and verified radio node may be limited based on the scores received during the configuration testing. The score values may be based on factors such as, but not limited to, assessments related to performance, accuracy, usefulness, capability of the first radio node 104.

FIG. 8 illustrates an exemplary process flow for authorized and verifying a first radio node 104 as an authorized and verified radio node. In this example, the configuration testing 302 can be established by the first radio node 104 sending a request for authorization and verification as an access node to a controller node 102. This can result in the controller node 102 sending the configuration test message 110 to the first radio node 104.

The configuration testing of the first radio node 104 is carried out based on a configuration testing and verification list (CTVL). The CVTL comprises a check list of verification tests to be performed that can be standardized for the automation of the verification of the first radio node 104. The execution of the CVTL is carried out automatically by the controller node 102 or the second radio nodes 106. One advantage of this is that the first radio node 104 can be automatically categorized and the capabilities verified.

The verification tests pertain to the different parameters and capabilities of the first radio node. In one embodiment the verification of a certain radio node status, such as, power-verified status, precoding-verified ANd status, etc., may comprise a series of configuration and operation tests performed for a certain set of test context instances each consisting of a certain sets of testing scenarios. An advantage of this is that functional elements and configuration settings and parameters can be tested in different test contexts and with different parameter values. Another advantage is that by means of different test contexts and scenarios, different protocols and software can be validated for proper and intended operation.

The CTVL is mapped to different verifications and authorization levels of radio node operation. When the first radio node 104 completes the set of tests corresponding to a lower authorization level it is verified to be authorized to operate as a radio node with operation limitations that correspond to that authorization level. The mapping of the CTVL to different verifications and authorization levels of radio node configuration and operation is specified based on operators, national or international standards. As an example, a radio node that wants to be configured and operate as a "pico node" shall fulfill certain requirements according to the pico access node configuration and operation specification. Among other requirements, one requirement may be that the power transmission shall typically not exceed 1 W and it shall implement a certain interface towards user nodes consisting of certain protocol layers and functions. These and other implementation requirements are generally listed in the configuration and operation specification of the pico access node.

For a radio node to be verified and authorized to be configured and operate as "pico access node" the requirements in the configuration and operation specification list are tested in real time. The test instructions and the test contexts may be also specified by the operator, or an operators' forum at a national or international level. The configuration and operation specification, the test instructions and the test contexts may be stored in a database located, for example, at an operator's site or more centrally at the operators' forum.

In the example of FIG. 8, the configuration testing is established or initiated 302 and a verification test of the first radio node 104 is carried out. After the test is carried out, the verification list is updated 804 to show that the parameter has been tested. The verified configuration parameter is removed 806 from the CVTL and the CVTL is updated 808.

The CVTL is then checked 810 to determine if there is another parameter to be tested during the authorization and verification testing. If so, the next configuration parameter is selected from the CVTL and a next configuration test is performed 812.

It is determined 814 if the configuration test was successful. If yes, a verification label is assigned 816 and the verification list is updated 804. If the configuration test was not successfully completed, the CTVL is updated 808. The CVTL is then checked 810 for another parameter to be tested.

In one embodiment, the authorization of the first radio node 104 is verified incrementally, i.e., the first radio node 104 is verified and assigned 818 a radio node status when the testing of the verification list has been completed successfully. The advantage of this procedure is that it would allow the authorization of the first radio node 104 to operate as at least a partially or limited authorized and verified radio node according to the restrictions of that radio node status.

In another embodiment, the first radio node 104 is verified and authorized as an access node on the basis of configuration tests that are performed successfully. Each time a configuration test is performed 812 and it is determined 814 that the test was completed successfully, the status of the first radio node 104 is updated. For example, initially, the first radio node 104 is assigned an idle radio node operation role where the receivers of the first radio node 104 are tested. Upon the successful completion of the receiver tests the first radio node 104 is assigned a receiver-verified radio node status and is given permission to be involved in further configuration test settings such as power transmission settings, clock synchronization settings, antenna-reception/transmission settings etc. Upon successful completion of the configuration test settings the first radio node 104 is assigned a certain status, that include for example but are not limited to, power-verified radio status, clock synchronization-verified radio node status, precoding-verified radio node status, and ARQ-verified radio node status.

In another example the authorization and verification of the first radio node 104 is carried out accumulatively. The first radio node 104 is first verified and assigned a radio node status when the testing of all verification lists have been completed successfully. The advantage of this method is that it would allow the authorization of the first radio 104 node to operate as access node only when the first radio node 104 is proven to be an authorized and verified access node. Upon completion of the configuration testing and depending on the scores the first radio node 104 may be authorized and verified 320 to be full or limited operation authorization.

Figure 9:
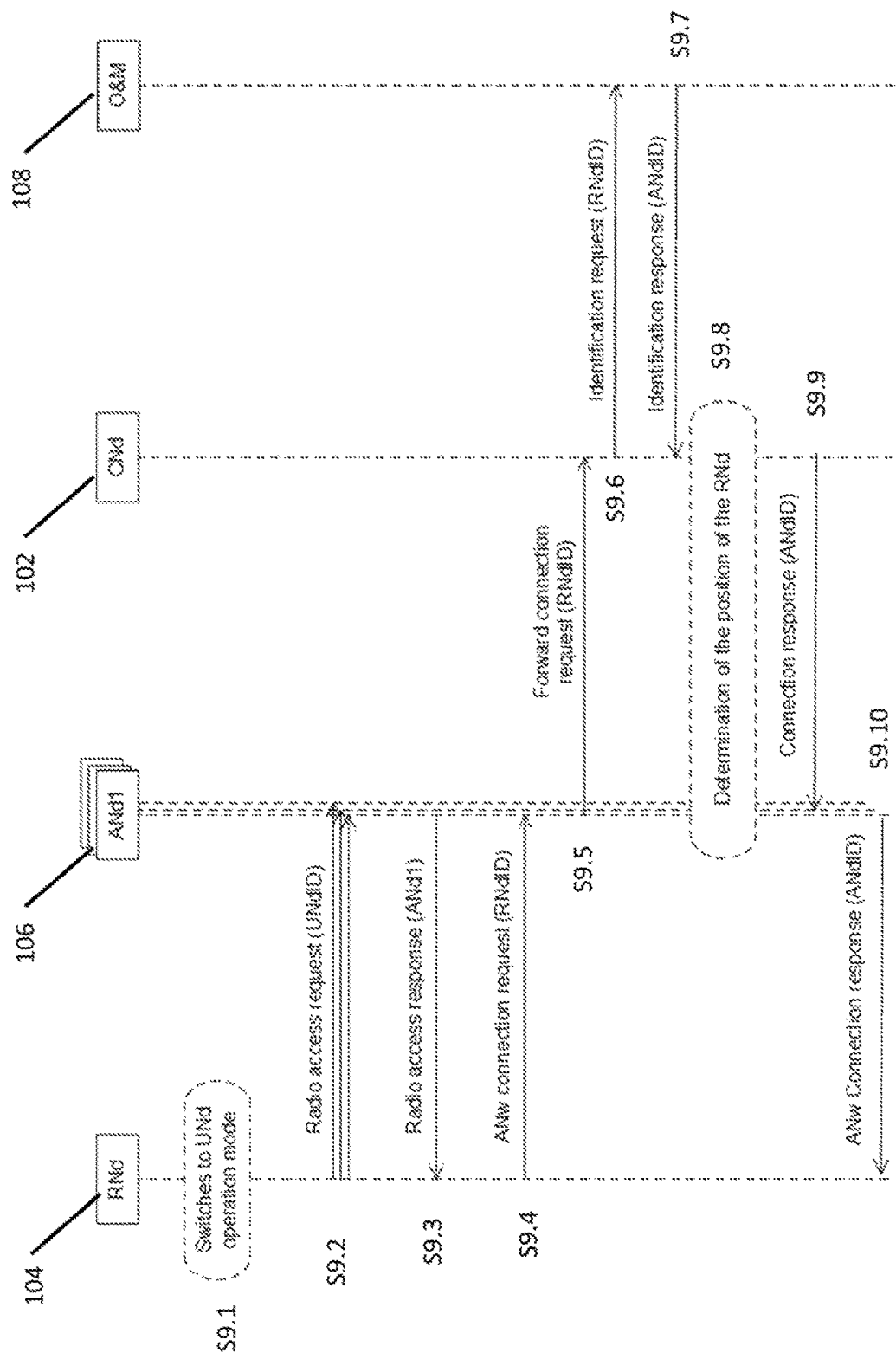
FIG. 9 is a schematic illustration of an exemplary automatic connection of a radio node to a controller node in accordance with the aspects of the disclosed embodiments.

Referring to FIG. 9, the aspects of the disclosed embodiments provide for the automatic connection of the first radio node 104 to the controller node 102. For the connection of the first radio node 104 to the controller node 102, any interface and potential data path available at hand can be used. This means that the first radio node 104, if it is a multiple mode device, may use any available and active interface it is equipped with, to contact the controller node 102.

In one embodiment the first radio node 104 is connected to controller node 102 via a cable, microwave links or wireless links belonging to another (air) interface i.e., other than the one it is should be tested and verified to operate at. In this case the first radio node 104 broadcasts a connection request following a standards procedure. Whenever a first radio node 104 does not have the possibility to connect to a controller node 102 via any other interface, it has to establish a wireless connection through the air interface it is equipped to operate at.

In the example of FIG. 9, first radio node 104 switches S9.1 into a user node operation mode to connect to a controller node 102 via second access nodes 106 that are controlled by the controller node 102. For example, when a new first radio node 104 powers on, it starts by acting S9.1 as a user node. The first radio node 104 performs scanning of the spectrum band and proceeds when it identifies an Access Network (ANw) in its vicinity in a user node manner.

Once connected, the first radio node 104 transmits S9.2 a radio access request (UNDiD). This can include information in the uplink via at least one neighboring recipient second radio node 106 of the access network. The information that is sent in the uplink (data or control plane) may include a radio node specific identifier (RNdID) to identify itself in this process. The international mobile equipment identity (IMEI) and the international mobile subscriber identity (IMSI) are example candidates of the RNdID. The RNdID is sent S9.2 with the request for basic radio node configuration setup.

The second radio node 106 responds S9.3 to the radio access request from the first radio node 104 with a radio access response (ANd1). The first radio node 104 then sends S9.4 an access network connection request (RNdID) to the second radio node 106.

In one embodiment, the second radio node 106 may forward S9.5 access network connection request (RNdID) to the controller node 102. The controller node 102 forwards S9.6 the identification request (RNdID) to the operation and maintenance functions database 108. The controller node 102, in cooperation with other operation and maintenance functions database 108, determines whether this RNdID of the first radio node 104 belongs to the network 100. The O&M server 108 will provide an identification response (ANdID) to the controller node 102. Depending on whether the RNdID belongs to the list of nodes controlled by the controller 102, the controller node 102 disregards the connection request from the first radio node 104 or responds back with a connection response S9.9 to the second radio node 106 with necessary information to setup the connection link with the first radio node 104.

The RNdID allows the controller node 102 to identify the first radio node 104. In one embodiment, the controller node 102 provide the first radio node 104 with an estimate S9.8 of the position of the first radio node 104 and the position of the backhaul node via one of the existing second radio nodes 106. Upon reception of the connection response S9.10 from the second radio node 106, the first radio node 104 forms a narrow-beam targeted to the backhaul node and can connect to it as a first step to establish a network link. Once the first radio node 104 is connected to the backhaul node the first radio node 104 proceeds with the registration to the access network and the testing procedure including authorization and authentication.

It should be noted that in the above procedure it is possible for the first radio node 104 to authenticate and register to the access network 100 prior to the connection setup. When the new first radio node 104 is able to receive in the downlink as a user node, it is also possible that it is directly authenticated and registered to the access network 100 by one of the neighboring second access nodes 106.

If the first radio node 104 fails to connect or its request to connect as an access node is rejected, the first radio node 104 proceeds with the next access network that it has identified from the scanning process. This may require adjustment of the transmit power.

Figure 10:
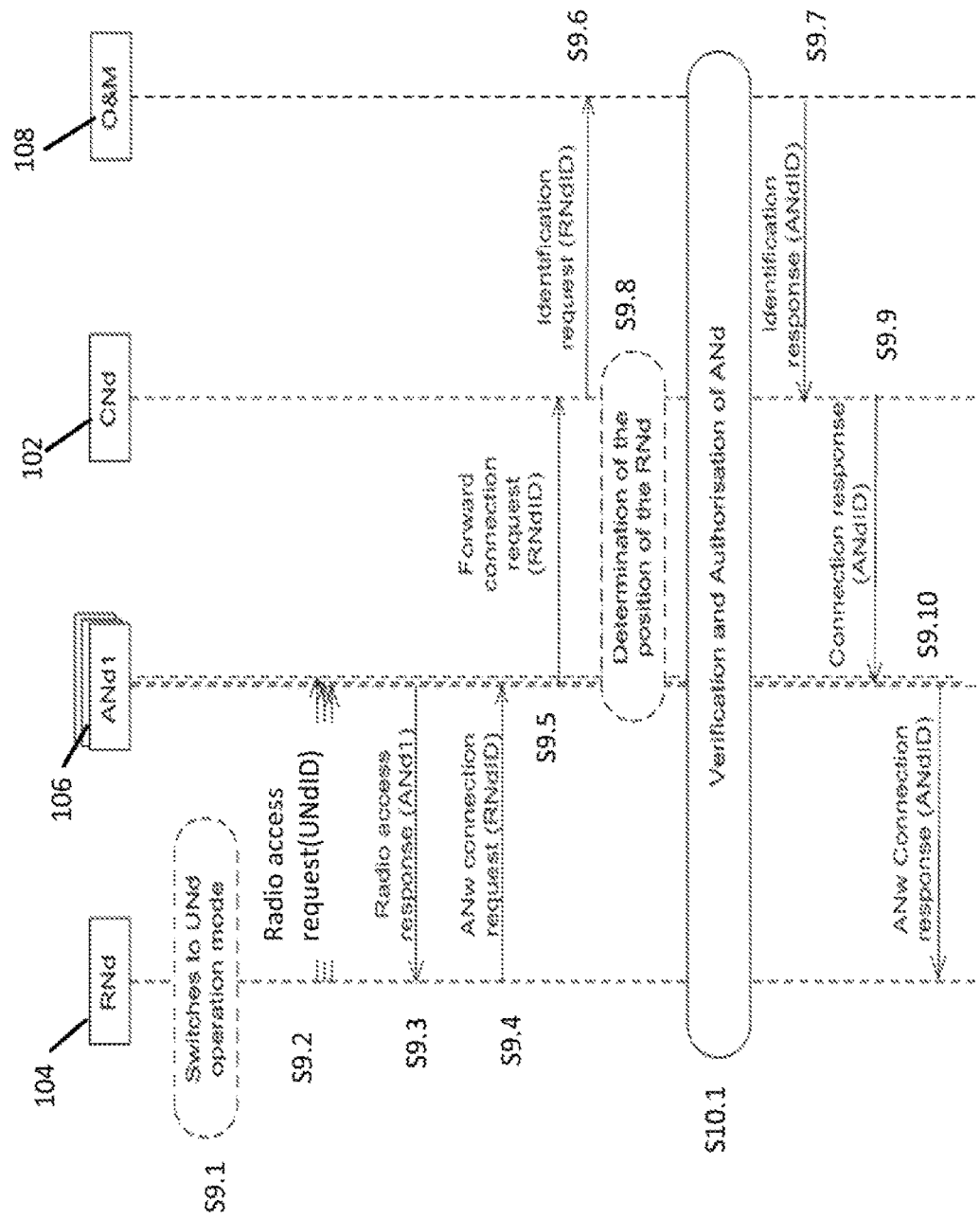
FIGS. 10 and 11 are schematic illustrations of the triggering the verification and authorization of a first radio node in accordance with the aspects of the disclosed embodiments.

FIG. 10 illustrates one example of triggering the authorization and verification of a first radio node 104. The first radio node 104, also referred to as the requesting radio node, contacts the controller node 102 of the access network 100 with a request to be registered and operate as an access node of the access network 100 in a manner similar to that described with respect to FIG. 9. In the example of FIG. 10, the controller node 102 may request the authorization and verification S10.1 of the first radio node 104 before the first radio node 104 is allowed to connect and operate as an access node in the access network 100.

Figure 11:
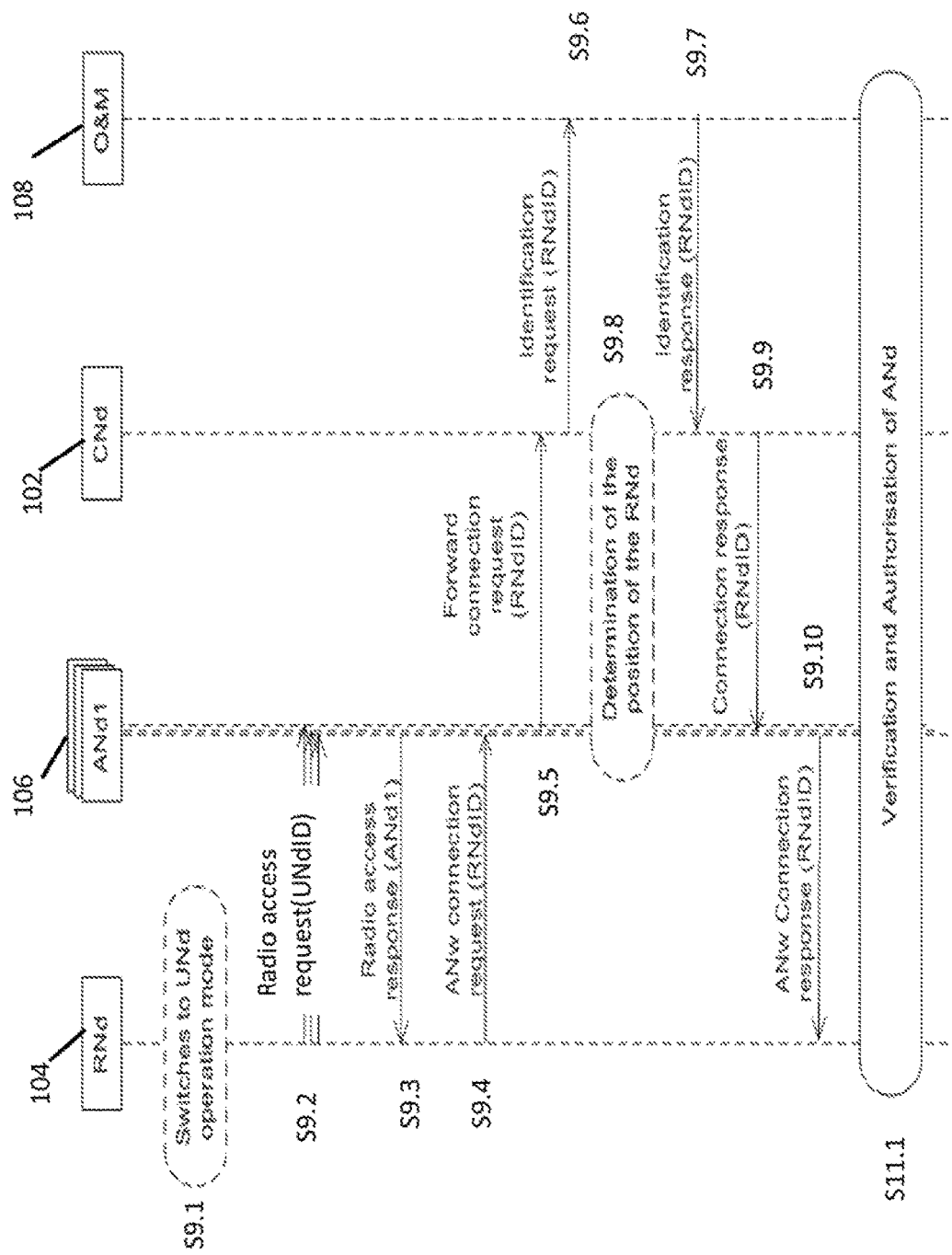

In the example of FIG. 11, when the first radio node 104 and the controller node 102 already have a connection, the first radio node 104 may request 11.1 the verification and authorization by the controller node 102 to operate as an access node of the access network 100. Typically, this occurs when a request from the first radio node 104 to be registered and operate as an access node of the access network 100 has been rejected by the controller node 102.

Figure 12:
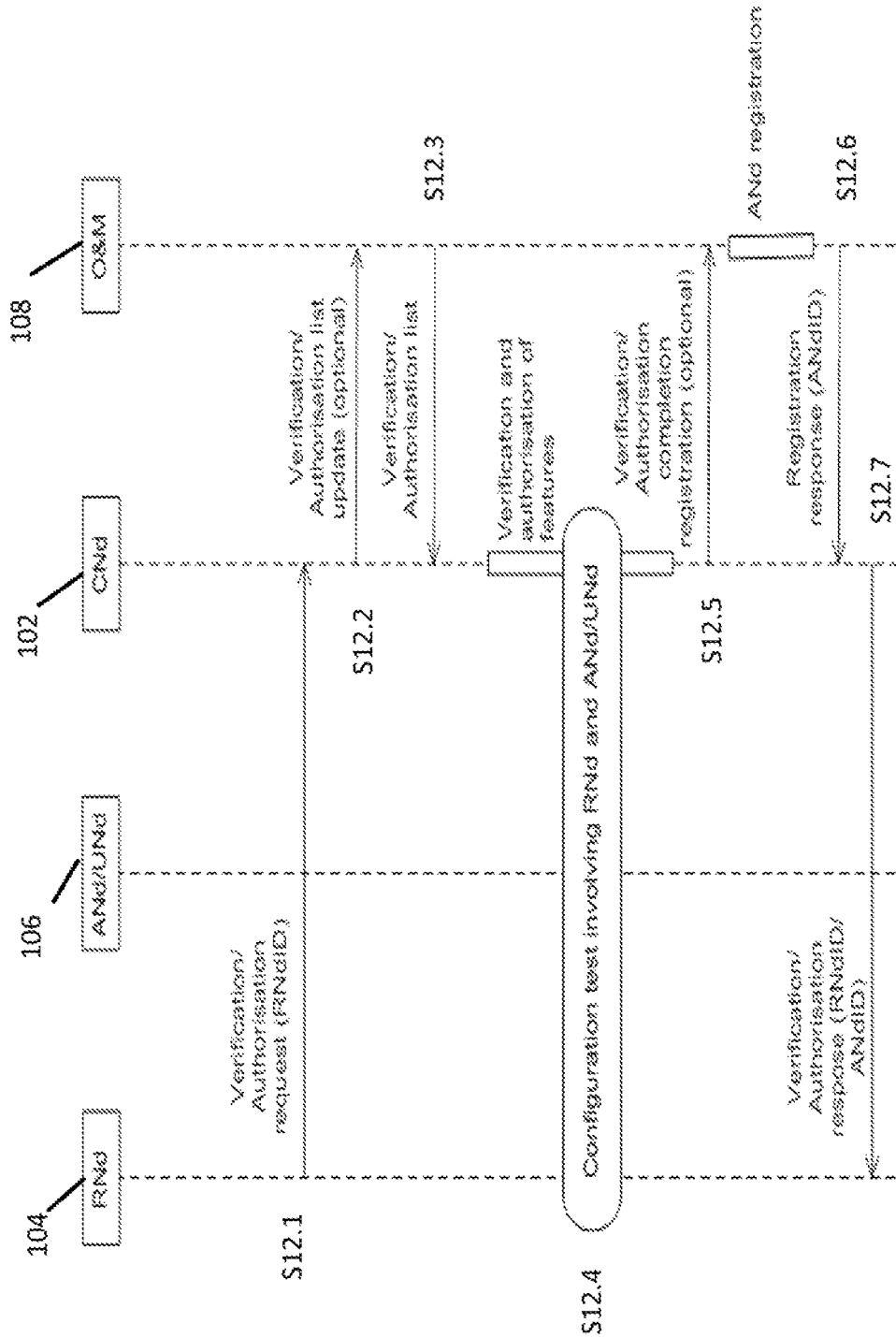
FIG. 12 is a schematic illustration of the verification and authorization of the first radio node by the controller node as initiated by the first radio node.

FIG. 12 illustrates one example of the verification and authorization of a first radio node 104 by a controller node 102 initiated by the first radio node 104. In this example, the first radio node 104 sends S12.1 a request to the controller node 102 to be verified and authorized as an access node. Unless a copy of the verification/authorization list of feature specifications is to be found locally within the controller node 102, the controller node 102 may request S12.2 the latest feature specification list for access nodes by the O&M server 108 in the network domain. The O&M server 108 sends S12.3 the list to the controller node 102, which goes through the list and performs configuration testing S12.4 as described with respect to FIG. 8, which shows the verification/authorization and configuration testing flow. If the first radio node 104 fulfills the list of feature specifications, the first radio node 104 is verified as a valid and proper operating access node and is registered to operate as an authorized and verified access node. The registration S12.5 is performed by the O&M 108 which issues S12.6 an ANdID for the addressing of the newly authorized and verified access node in the access network 100. The controller node 102 sends S12.7 a verification and authorisation response to inform the first radio node 104 that that it is in now verified and authorized to operate as an access node with an ANdID.

Figure 13:
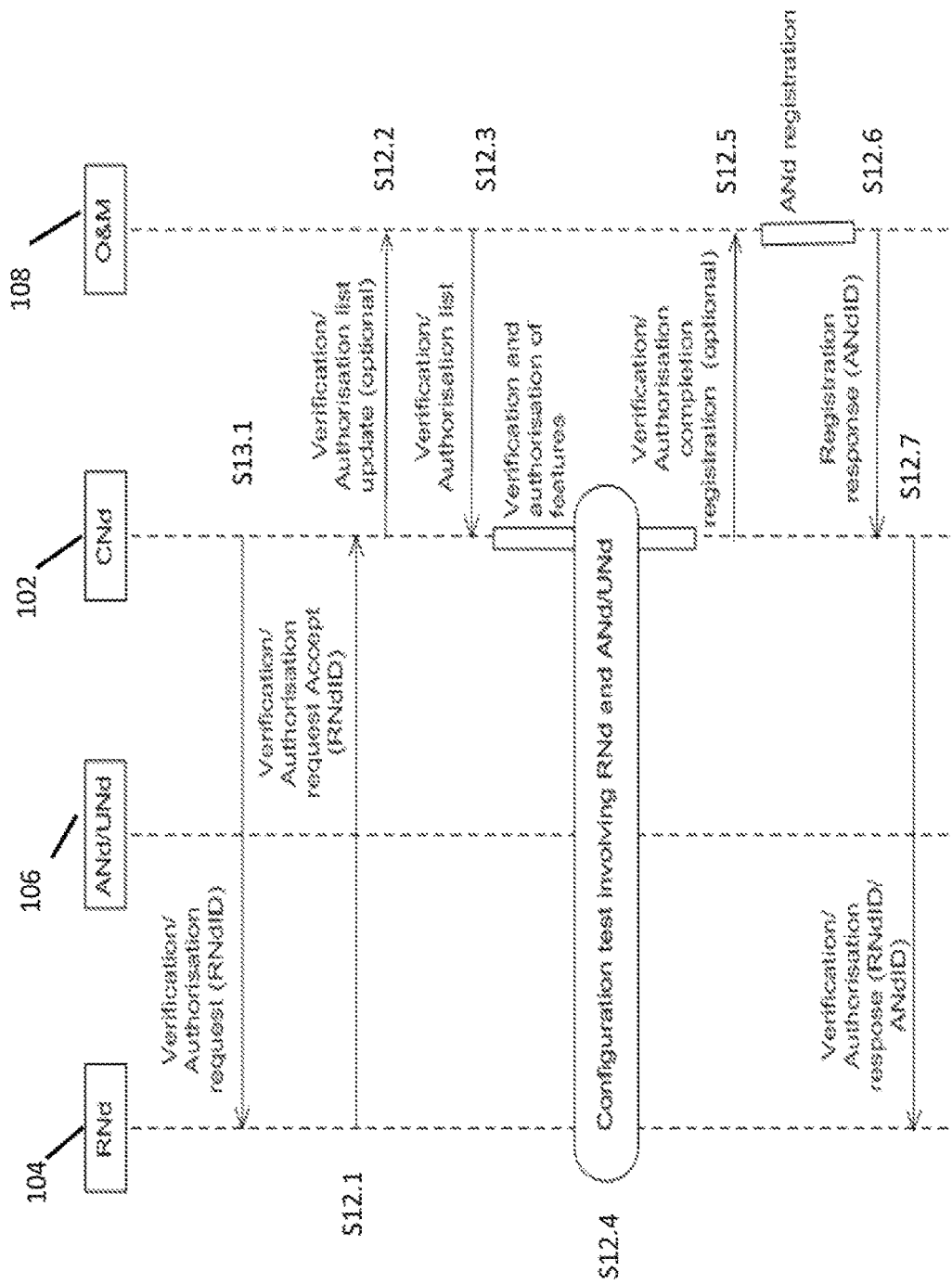
FIG. 13 is a schematic illustration of the verification and authorization of the first radio node by the controller node as initiated by the controller node.

In one embodiment, the verification and authorization process may be initiated by the controller node 102. FIG. 13 illustrates one example of the controller node 102 requesting that the first radio node 104 be authorized and verified as an access node. In this case the controller node 102 sends S13.1 a verification and authorization request to the first radio node 104. The rest of the procedure is similar to that described above with respect to FIG. 12, assuming that the first radio node 104 replied positively to the request S13.1.

Figure 14:
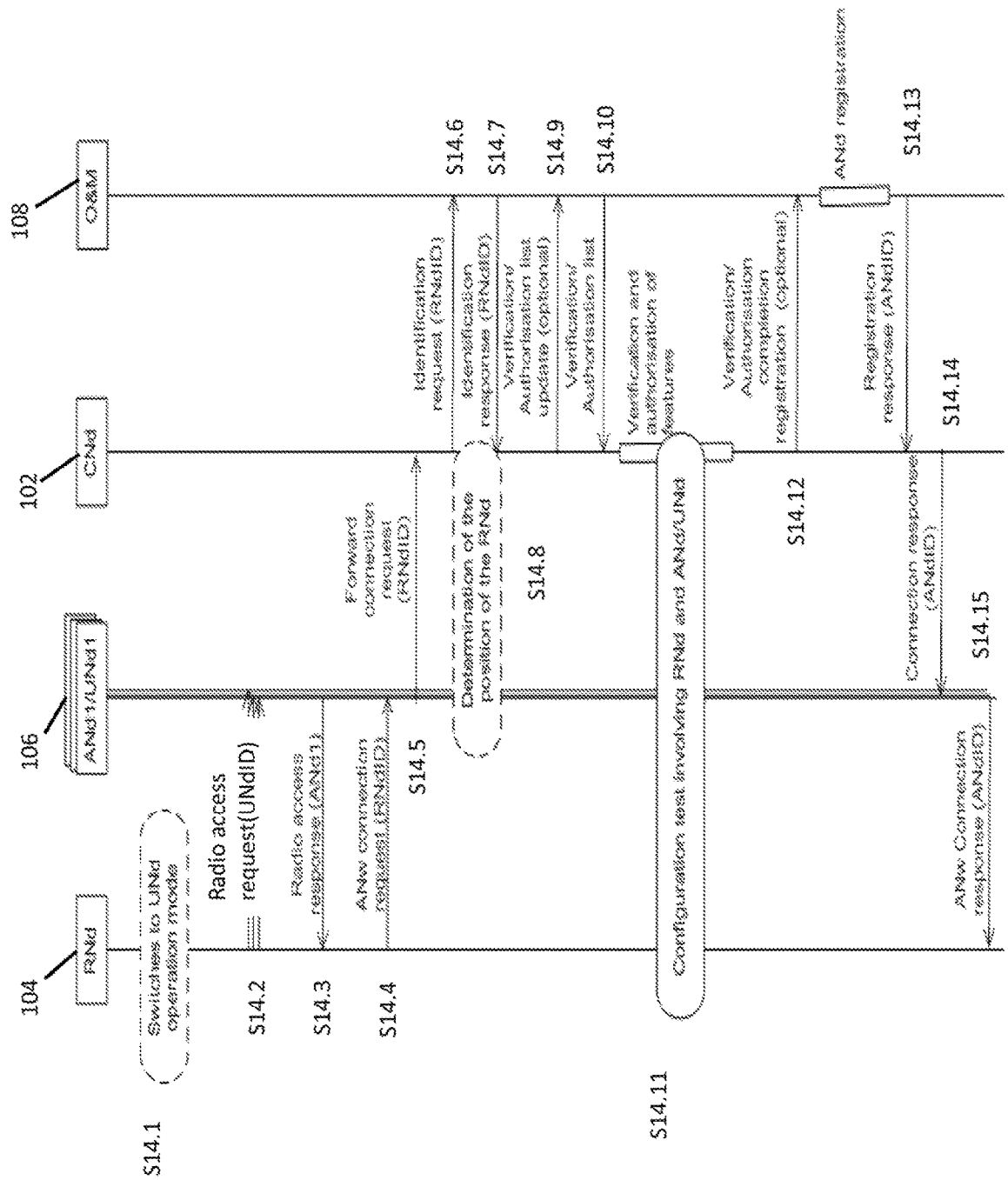
FIG. 14 is a schematic illustration of the verification and authorization of the first radio node by the controller node as initiated by the first radio node request to connect to the access network.

FIG. 14 illustrates another exemplary verification and authorization process. In this example, the verification and authorization request and response S12.1 and 12.2 of FIGS. 12 and 13 are omitted. The first radio node 104 switches S14.1 to a user node operation mode. The verification and authorization process is the triggered by the first radio node 104 request S14.2 to connect to the access network 100. The second radio node 106 responds S14.3 with the radio access response (ANd1). The first radio node 104 requests S14.4 an access network connection. The second radio node 106 forwards S14.5 the access network connection request to the controller node 102. The controller node 102 sends S14.6 an identification request to the O&M server 108. The O&M server 108 sends an identification response S14.7 to the controller node 102. The controller node 102 determines S14.8 the position of the first radio node 104.

The controller node 102 optionally sends S14.9 a verification/authorization list update to the O&M server 108. The O&M server 108 responds S14.10 with an updated list. A configuration test is executed S14.11. The configuration testing S14.11 is similar to the configuration testing described above.

Upon completion of the configuration testing, an optional verification/authorization completion response is sent to the O&M server 108. The registration response (ANdID) is sent S14.13 from the O&M server 108 to the controller node 102. The controller node 102 sends S14.14 the connection response to the second radio node 102, which sends S14.15 the access network response to the first radio node 104.

One example of explicit power transmission setting is described below. This example assumes a first radio node 104, a second radio node 106 and a controller node 102. A testing scenario can involve any radio node including user nodes. The controller node 102 prepares the testing scenario. The controller node 102 transmits at least one configuration testing message 110 to the first radio node 104. The configuration testing message 110 includes configuration test settings of Resources: Frequency F; network nodes: first radio node 104 (tested node); second radio node 106 (tester node); controller node 102 (controller); functions: power transmission setting configuration; the operation and configuration testing scenario within the context; and reports: transmit power, time: duration per test 1 second for a period of 10 seconds from 18:00:00 to 18:00:10.

The controller node 102 also transmits at least one configuration testing message to the second radio node 106, which includes the configuration test settings of Resources: Frequency F1 (downlink); network nodes: R1 (tested) A1 (tester) C1 (controller); functions: power transmission setting configuration; the operation and configuration testing scenario within the context; reports: received power, time: duration per test 1 seconds for a period of 10 seconds from 18:00:00 to 18:00:10.

Both the first radio node 104 and the second radio node 106 create the configuration context, enter a test mode and respond READY. In this example, the testing scenario aims at finding a transmit power level TPL that the first radio node 104 may operate so as the received signal strength RSS at the A1 should not exceed a certain threshold RSSTh1.

The controller node 102 issues a first configuration testing instruction message with the operational setting instructing the first radio node 104 to transmit at TPL, say 30 dBm. A corresponding configuration testing instruction message with the operational setting is sent to the second radio node 106 to receive. The first radio node 104 operates and both the first radio node 104 and the second radio node 106 report at 18:00:01. If the received signal strength (RSS) reported by the first radio node 104 exceeds RSSTh1, the controller node 102 continues with a second configuration testing instruction message instructing the first radio node 104 to transmit at say TPL=7 dBm. The second radio node 106 is instructed to receive. The first radio node 104 operates and the first radio node 104 and the second radio node 106 report at 18:00:02 etc. The controller node 102 continues in this manner until it identifies a TPL value for the first radio node 104 for which the RSS at the second radio node 106 does not exceed RSSTh1. The controller node 102 collects the testing reports from the first radio node 104 and the second radio node 106 on the transmit power and received power, respectively, and combines them to determine the configuration setting and the operative capability of the first radio node 104.

The following is an example of an implicit power transmission setting procedure. This example assumes at least one first radio node 104, at least one second radio node 106 and a controller node. The controller node 102 prepares the testing scenario and transmits at least one configuration testing message 110 to the first radio node 104. The configuration testing message 110 in this example includes the configuration test settings or parameters of Resources: Frequency F1; network nodes: R1 (tested) A1 (tester) C1 (controller); functions: power transmission setting configuration, interval [10 dBm, 30 dBm], step: 3 dBm; the operation and configuration testing scenario within the context; reports: transmit power, time: duration per test 1 second for a period of 10 secs from 18:00:00 to 18:00:10.

The controller node 102 also transmits at least one configuration testing message 110 to the at least one second radio node. The configuration testing message 110 includes the configuration test settings of Resources: Frequency F1 (downlink); network nodes: R1 (tested) A1 (tester) C1 (controller); functions: power transmission setting configuration, the operation and configuration testing scenario within the context; reports: received power, time: duration per test 1 second for a period of 10 secs from 18:00:00 to 18:00:10.

Both the first radio node 104 and the second radio node 106 create the configuration context, enter a test mode and respond READY. This testing scenario aims at finding a transmit power level TPL that the first radio node 104 may operate at so that the received signal strength at the second radio node should not exceed a certain threshold RSSTh1.

The controller node 102 issues one configuration testing instruction message with the operational setting instructing the first radio node 104 to transmit at TPL at the interval and in adjustment steps as given by the context. A corresponding configuration testing instruction message is sent to the second radio node 106 to receive. The first radio node 104 and the second radio node 106 operate iteratively through the values in the interval as instructed until the RSS reported by the second radio node 106 does not exceed RSSTh1. Upon iteration termination, the first radio node 104 and the second radio node 106 report the testing results to the controller node 102. The controller node 102 collects the testing reports from the first radio node 104 and the second radio node 106 on the transmit power and received power, respectively, and combines them to determine the configuration setting and the operative capability of the first radio node 104. In one embodiment, the second radio node 106 can also communicates the result to the first radio node 104 so as to terminate the test configuration and test mode when the condition is met.

Figure 15:
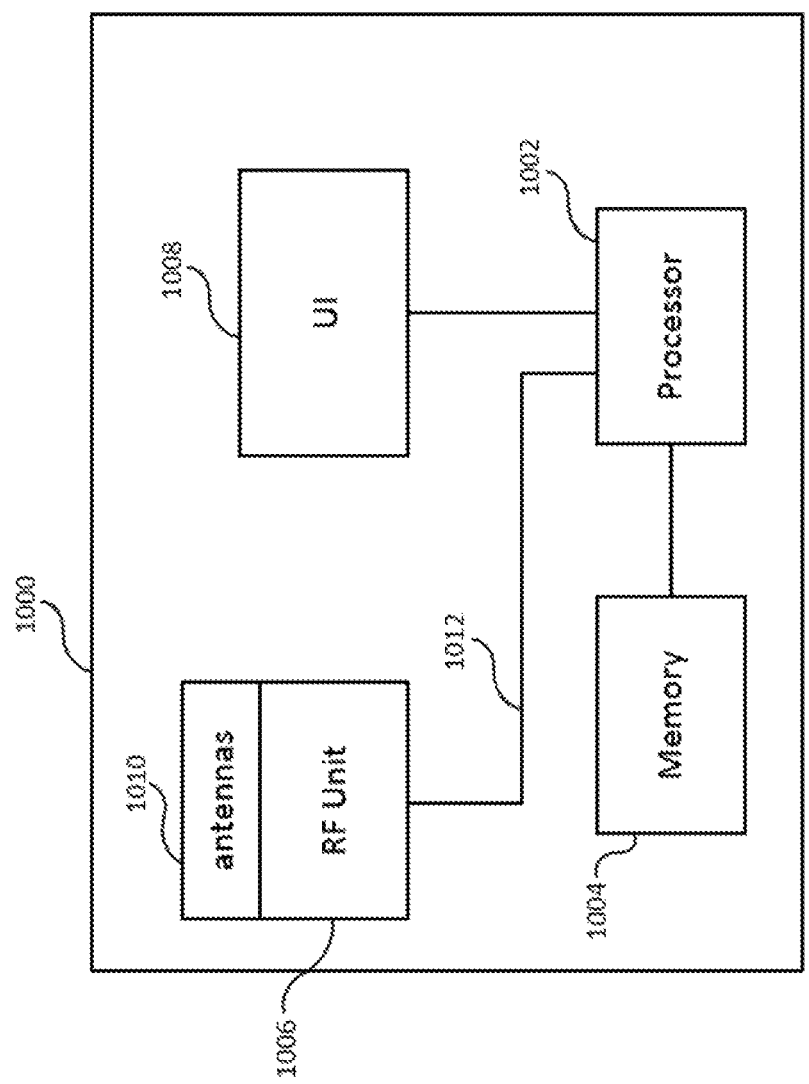
FIG. 15 is a block diagram of an exemplary apparatus that can be used to practice aspects of the disclosed embodiments.

FIG. 15 illustrates a block diagram of an apparatus 1000 that can be used to practice aspects of the present disclosure. The apparatus 1000 is appropriate for implementing embodiments of the access network, first and second radio nodes, the controller node and methods described herein. Individual ones of the apparatus 1000 as described herein can be implemented in one or more of the controller node 102, the first radio node 104, the second radio node 106.

The apparatus 1000 generally includes a processor 1002 coupled to a memory 1004, and a radio frequency (RF) unit 1006, also referred to herein as a transceiver. In one embodiment, the RF unit 1006 can include one or more antennas 1010, such as the antenna array 150 described herein.

The apparatus 1000 can also include a user interface (UI) 1008. The apparatus 1000 may be a node in a wireless communication system and used as a transmitter and/or receiver, such as in a base station. It may be desirable when using the apparatus 1000 as a base station to remove the UI 1008 and administer the apparatus 1000 remotely via a network or other type of computer interface (not shown).

The processor 1002 may be a single processing device or may comprise a plurality of processing devices including special purpose devices, such as for example digital signal processing (DSP) devices, microprocessors, or other specialized processing devices as well as one or more general purpose computer processors including parallel processors or multi-core processors. The processor 1002 is configured to perform embodiments of the processes described herein.

The processor 1002 is coupled to a memory 1004 which may be a combination of various types of volatile and/or non-volatile computer memory such as for example read only memory (ROM), random access memory (RAM), magnetic or optical disk, or other types of computer memory. The memory 1004 stores computer program instructions that may be accessed and executed by the processor 1002 to cause the processor 1002 to perform a variety of desirable computer implemented processes or methods as are described herein. The program instructions stored in memory 1004 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 1004 are program data and data files which may be accessed, stored, and processed by the computer program instructions.

The RF Unit 1006 is coupled to the processor 1002 and configured to transmit and receive RF signals based on digital data 1013 exchanged with the processor 1002. The RF Unit 1006 is configured to transmit and receive radio signals that may conform to one or more of the wireless communication standards in use today, such as for example LTE, LTE-A, Wi-Fi, or may be configured for future radio access techniques. The RF Unit 1006 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal 1013 is then sent to the processor 1002. In transmitter applications, the RF Unit 1006 is configured to receive digital information in the form of digital data 1013 from the processor 1002 and transmit it to one or more receivers such as mobile devices or UE.

In an embodiment of an apparatus 1000 that includes a UI 1008, the UI 1008 may include one or more user interface elements such as a touch screen, keypad, buttons, voice command processor, as well as other elements adapted for exchanging information with a user.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A controller node for a wireless communication system, comprising:
 a processor configured to operate the controller node in a configuration test context to:
 transmit at least one configuration test message to at least one first radio node, the configuration test message including at least one configuration test setting and at least one operational setting;
 receive a test report from the at least one first radio node indicating at least one result of at least one configuration test of the configuration test context;
 determine from the test report a capability of the at least one first radio node to operate as an authorized and verified radio node in the wireless communication system; and
 transmit the capability to the at least one first radio node, the capability of the at least one first radio node is to operate as an authorized and verified radio node in the wireless communication system;
 wherein the controller node is configured to determine the capability of the at least one first radio node to operate as the authorized and verified radio node by:
 identifying at least one score value in the test report for the at least one configuration test;
 verifying a configuration parameter associated with the at least one configuration test if the at least one score value indicates a successful completion of the at least one configuration test; and
 mapping the verified configuration parameter to an authorized operation of an access node, wherein the mapping identifies the capability of the at least one first radio node to operate as the authorized and verified radio node.

2. The controller node according to claim 1, wherein the controller node is configured to:
 identify a next configuration test setting and a next operational setting from a configuration testing and verification list;
 map the next configuration test setting and the next operational setting to the configuration test message to be transmitted to the at least one first radio node to perform the at least one configuration test.

3. The controller node according to claim 1, wherein prior to transmitting the configuration test message to the at least one first radio node, the controller node is configured to receive a request from the at least one first radio node, as an unauthorized and unverified radio node, for authorization and verification as an authorized and verified radio node in the wireless communication system.

4. The controller node according to claim 1, wherein the controller node is configured to transmit an authorization and verification message to the at least one first radio node to enable the at least one first radio node to operate as an authorized radio node in the wireless communication system.

5. A first radio node for a communication system, comprising:
 a processor configured for operating the first radio node in a configuration test context to:
 receive a configuration test message, the configuration test message including at least one configuration setting and at least one operational setting for operating the first radio node;
 operate, during a configuration test, at least one radio resource, at least one network element, at least one communication function, and a protocol associated with the first radio node based on the at least one configuration test message and the at least one operational setting;
 cause the first radio node to communicate with at least one second radio node identified in the configuration test message during the configuration test for determining at least one result of the operation of the one or more of the at least one radio resource, the at least one network element, the at least one communication function, and the protocol associated with the first radio node based on the at least one configuration test message and the at least one operational setting;
 transmit a reply message with the at least one result of the operation of the first radio node and the communication with the at least one second radio node;
 determine if a result of the operation of the first radio node in the configuration test using the at least one operational setting is at a pre-determined value;

identify a next operational setting of the at least one operational setting if the result of the operation is not at the pre-determined value;

operate the first radio node in at least one next configuration test using the next operational setting; and report a value of the operational setting to the controller node in the reply message when the result of the operation of the first radio node is at the pre-determined value.

6. The first radio node according to claim 5, wherein the first radio node is configured to receive an authorization that the first radio node is an authorized and verified radio node.

7. The first radio node according to claim 5, wherein the first radio node is an unauthorized and unverified radio node and the first radio node is configured to transmit a request to a controller node for authorization and verification as an authorized and verified radio node in the communication system.

8. The first radio node according to claim 5, wherein the processor is further configured to cause the first radio node to send a configuration test ready message to the controller node after enabling the configuration test context.

9. The first radio node according to claim 5 wherein the first radio node is configured to receive a configuration test release after communicating the result of the operation of the first radio node in the reply message to the controller node and exit the configuration test context.

10. A communication system comprising:

a controller node, at least one first radio node and at least one second radio node, the controller node configured to transmit at least one configuration test message to the at least one first radio node and to the at least one second radio node, the configuration test message including at least one configuration setting for at least one configuration test context of the at least one first radio node and the at least one second radio node and at least one operational setting for operating the at least one first radio node and the at least one second radio node in the at least one configuration test context during a configuration test;

the at least one configuration test message configured to enable the at least one configuration test context for operation of one or more of at least one radio resource, at least one network element, at least one communication function, a protocol associated with the at least one first radio node and the at least one second radio node;

the at least one first radio node and the at least one second radio node configured to operate in the configuration test of the test configuration context using the at least one operational setting;

the at least one first radio node configured to transmit a reply message with at least one result of the operation of the at least one first radio node in the configuration test and the at least one second radio node configured to transmit a reply message with at least one result of the operation of the at least one second radio node in the configuration test; and the at least one first radio node configured to receive an authorization message that the at least one first radio node is an authorized and verified radio node.

11. The communication system according to claim 10, wherein the controller node is further configured to receive the at least one result of the operation of the at least one first radio node in the at least one configuration test context;

determine if a pre-determined test result is met; and if not, transmit at least one other configuration test message to one or more of the at least one first radio node and the at least one second radio node, the at least one other configuration test message including at least one other operational setting for operating the at least one first radio node and the at least one second radio node in the at least one configuration test context during at least one next configuration test.

* * * * *